United States Patent
Peters

(10) Patent No.: US 11,686,342 B2
(45) Date of Patent: Jun. 27, 2023

(54) SELF-ALIGNING BEARING ASSEMBLY FOR DOWNHOLE TOOLS

(71) Applicant: Baker Hughes, a GE Company, LLC, Houston, TX (US)

(72) Inventor: Volker Peters, Weinhausen (DE)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 118 days.

(21) Appl. No.: 16/825,124

(22) Filed: Mar. 20, 2020

(65) Prior Publication Data
US 2020/0300293 A1     Sep. 24, 2020

Related U.S. Application Data

(60) Provisional application No. 62/822,580, filed on Mar. 22, 2019.

(51) Int. Cl.
*F16C 17/10*     (2006.01)
*E21B 4/00*     (2006.01)
*E21B 17/10*     (2006.01)

(52) U.S. Cl.
CPC ............ *F16C 17/105* (2013.01); *E21B 4/003* (2013.01); *E21B 17/1078* (2013.01); *F16C 2352/00* (2013.01)

(58) Field of Classification Search
CPC .......................... F16C 17/105; F16C 2206/04; F16C 2206/40; F16C 2206/82; F16C 2223/42; F16C 2223/46; F16C 2352/00; E21B 4/003; E21B 17/1078
See application file for complete search history.

(56) References Cited

U.S. PATENT DOCUMENTS

| | | | |
|---|---|---|---|
| 6,092,610 A * | 7/2000 | Kosmala | E21B 4/20 175/73 |
| 7,552,782 B1 | 6/2009 | Sexton et al. | |
| 8,701,797 B2 | 4/2014 | Baudoin | |
| 2005/0098350 A1 | 5/2005 | Eppink et al. | |
| 2012/0285748 A1 | 11/2012 | Kirkhope | |
| 2013/0168152 A1* | 7/2013 | Panahi | E21B 7/062 175/74 |
| 2013/0299243 A1* | 11/2013 | von Gynz-Rekowski et al. | F16C 17/105 175/57 |
| 2014/0209389 A1 | 7/2014 | Sugiura et al. | |
| 2016/0312535 A1 | 10/2016 | Ritchie et al. | |

OTHER PUBLICATIONS

Karlsson, H., et al., "Performance Drilling Optimization," SPE/IADC 13474, 1985 Drilling Conference held in New Orleans, Louisiana, Mar. 6-8, 1985.

* cited by examiner

*Primary Examiner* — Phillip A Johnson
(74) *Attorney, Agent, or Firm* — Crowe & Dunlevy, P.C.

(57) ABSTRACT

An apparatus for use in a drill string configured for use in a subterranean formation includes a drive shaft coupled to a drill bit, the drill bit configured to continuously rotate and penetrate within the subterranean formation, a drill string housing that houses the drive shaft, the drive shaft continuously rotating within the drill string housing relative to the drill string housing, and a bearing assembly configured bear the drive shaft within the drill string housing, the bearing assembly comprising a first bearing surface having a first curvature.

22 Claims, 23 Drawing Sheets

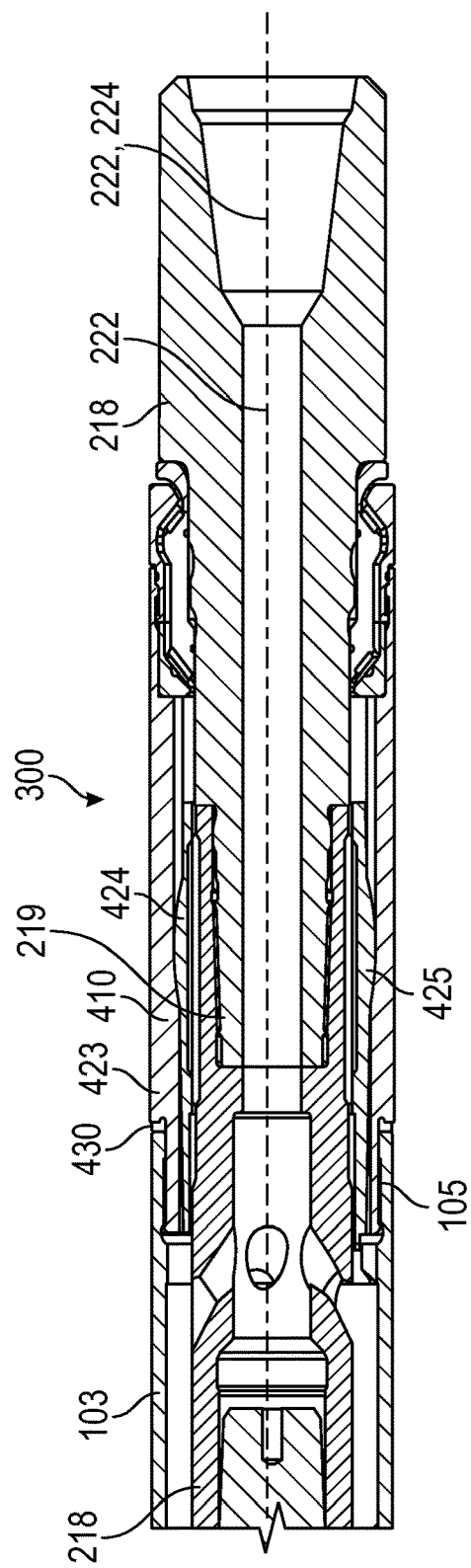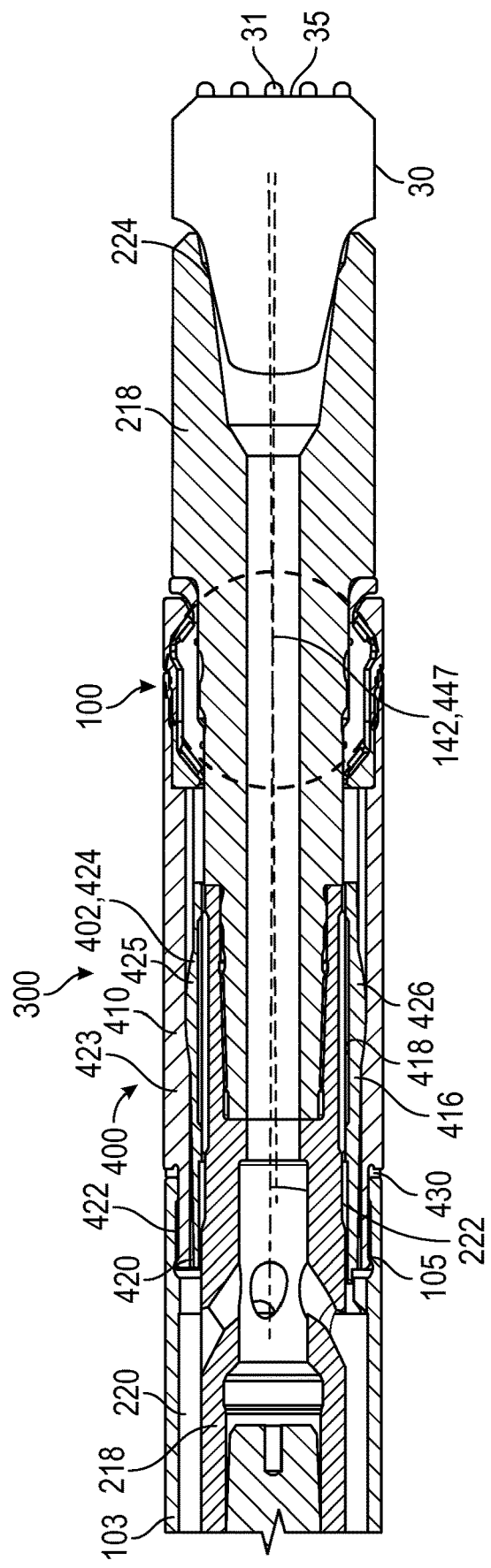
FIG. 5A
FIG. 5B

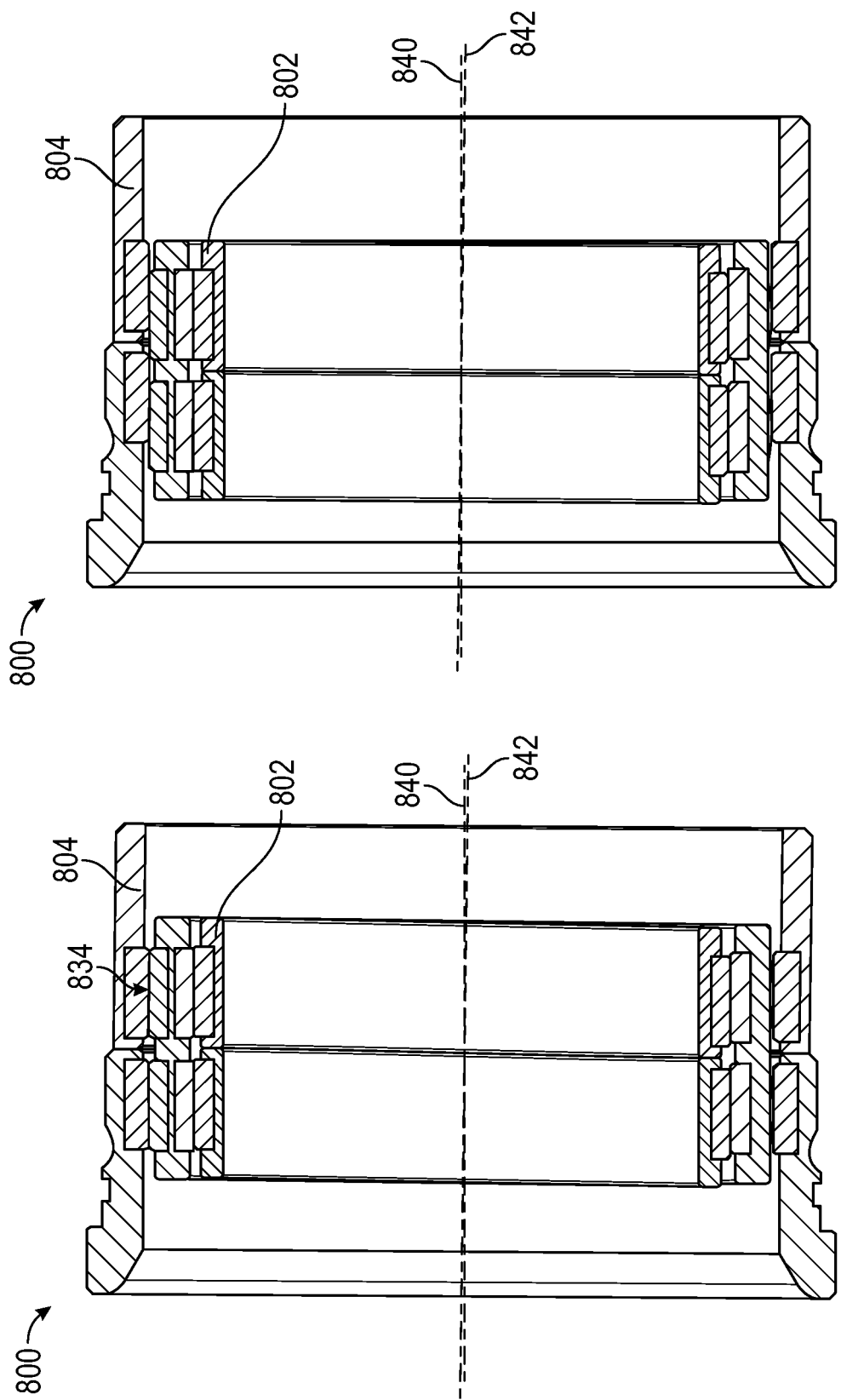

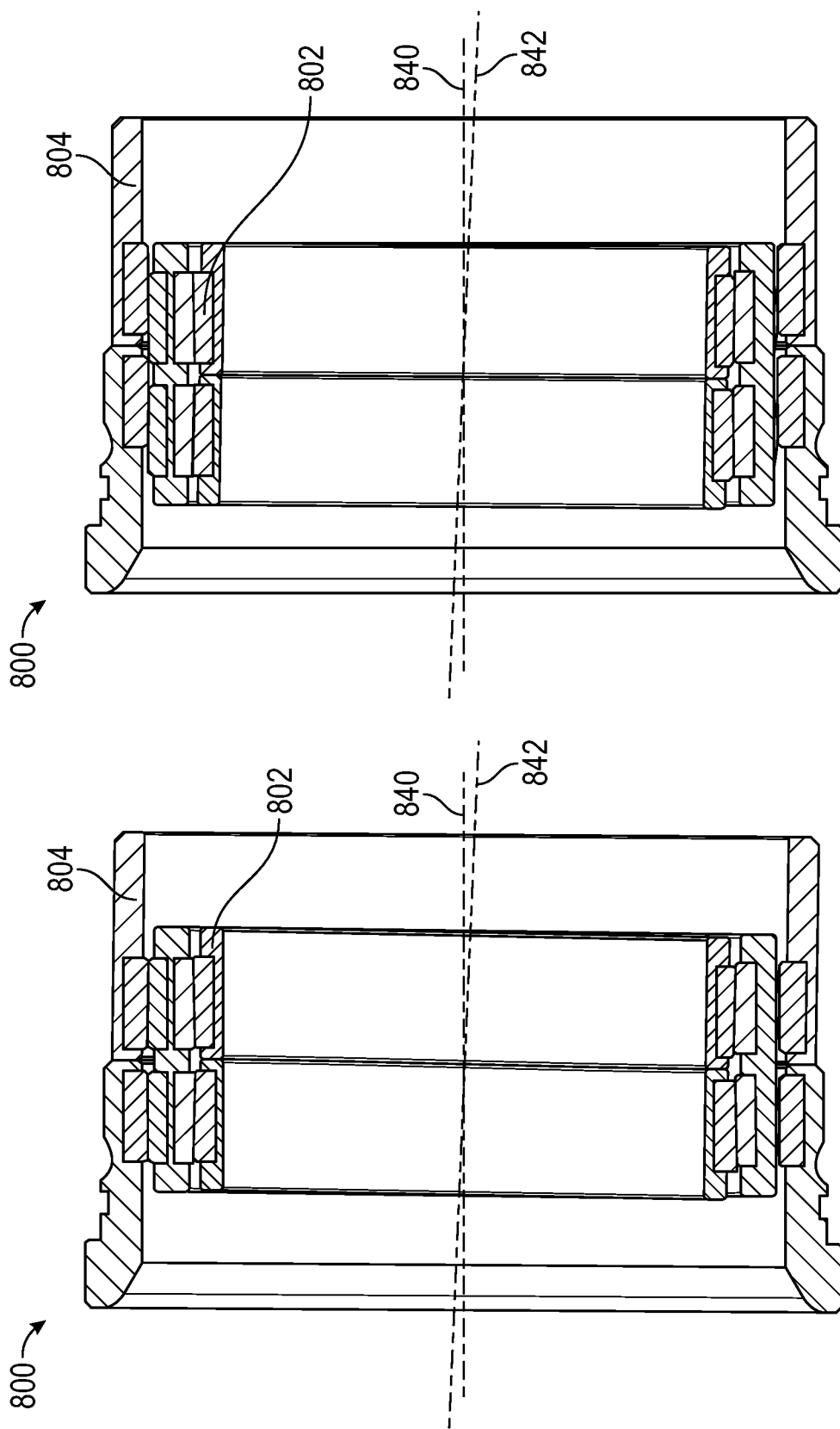

SELF-ALIGNING BEARING ASSEMBLY FOR DOWNHOLE TOOLS

CROSS-REFERENCES TO RELATED APPLICATIONS

This application claims priority from U.S. Provisional Patent Application Ser. No. 62/822,580, filed on Mar. 22, 2019, incorporated herein by reference in its entirety.

BACKGROUND OF THE DISCLOSURE

1. Field of the Disclosure

This disclosure relates generally to oilfield downhole tools and more particularly to bearing assemblies utilized for drilling wellbores.

2. Background of the Art

To obtain hydrocarbons such as oil and gas, boreholes or wellbores are drilled by rotating a drill bit attached to the bottom of a drilling assembly (also referred to herein as a "Bottom Hole Assembly" or ("BHA"). The drilling assembly is attached to the bottom of a tubing, which is usually either a jointed rigid pipe or a relatively flexible spoolable tubing commonly referred to in the art as "coiled tubing". The string comprising the pipe or the tubing and the drilling assembly is usually referred to as the "drill string". When jointed pipe is utilized as the tubing, the drill bit is rotated by rotating the jointed pipe from the earth's surface and/or by a drilling motor such as a mud motor contained in the drilling assembly. In the case of a coiled tubing, the drill bit is rotated by the drilling motor. During drilling, a drilling fluid (also referred to as the "mud") is supplied under pressure into the tubing. The drilling fluid passes through the drilling assembly and then discharges at the drill bit bottom. The drilling fluid provides lubrication to the drill bit and carries to the earth's surface rock pieces disintegrated by the drill bit in drilling the wellbore. The drilling motor is rotated by the drilling fluid passing through the drilling assembly. A drive shaft connected to the motor and the drill bit rotates the drill bit.

A substantial amount of current drilling activity involves drilling deviated and horizontal wellbores to more fully exploit hydrocarbon reservoirs. Often referred to as directional drilling, this drilling technique can provide boreholes that have relatively complex well profiles. One known deflection tool, a so-called tilted drive sub, for directional drilling has a housing with an inner surface and an outer surface, the inner surface having an inner surface rotational axis and the outer surface having an outer surface rotational axis that is offset and/or at an angle from the inner surface rotational axis. As a result, the outer diameter of the tilted drive sub is remaining straight with comparison to the mud motor's outer diameter while the internal bearing components are radially offset and/or offset at some predetermined angle. This concept allows to bring the position of the tilt relatively close to the drill bit. The effective bit to bend distance, known as one of the parameters for the design of a directional drilling motor, can be minimized using this approach. The bit to bend distance is defined by the distance from the inclined bearing axis intersection point with the longitudinal tool axis of the drilling tool to the bit face for this concept. One drawback of the prior art tilted drive sub design is the inability to change the tilt or offset angle without parts exchange and also complete disassembly/assembly of the bearing unit. Other known tools for directional drilling are bent subs or adjustable kickoff (AKO) tools. These tools utilize a deflection device that creates a tilt in the outer housing of a BHA. The tilt angle of the AKO can be adjusted on a rig floor.

Because bent subs or adjustable kickoff tools are positioned uphole of a bearing section, these assemblies are known to exert high side loads and bending moments at the drill bit, the stabilizer, and the bend, caused by the large bit to bend distance, thus creating high bit offset from the rotational axis of the drilling tool. This is especially the case when they are used for drilling a straight section of the wellbore. In such instances, the housing, which includes the bend, is rotated. High side load in combination with misalignment of the bearing/drive shaft axes and the housing axis contributes to wear and damage of the radial and/or axial bearing. Bearing wear is known to be one major contributor to service limitation and repair costs.

Another known tool for directional drilling is a rotary steering system configured for directional drilling with continuous rotation from the earth's surface. Rotary steering systems may utilize a so-called non-rotating sleeve that is rotatably disposed around the drill string by means of a bearing system. Actuator elements are used to push the non-rotating sleeve outwards to create a deflection on the drill string. The deflections on the drill string create side loads and bending moments on the drill string and/or the non-rotating sleeve which may create a higher probability for damage or wear in the bearing system supporting the non-rotating sleeve. A similar embodiment comprises a non-rotating stabilizer that is rotatably disposed around the drill string utilizing a bearing system.

The present disclosure addresses these and other drawbacks of the prior art and generally addresses the need for more robust and durable devices for drilling such wellbores as well as wellbores for other applications such as geothermal wells.

SUMMARY OF THE DISCLOSURE

In aspects, the present disclosure provides an apparatus for use in a drill string configured for use in a subterranean formation. The apparatus may include a drive shaft coupled to a drill bit, the drill bit configured to continuously rotate and penetrate within the subterranean formation; a drill string housing that houses the drive shaft, the drive shaft continuously rotating within the drill string housing relative to the drill string housing; and a bearing assembly configured bear the drive shaft within the drill string housing, the bearing assembly comprising a first bearing surface having a first curvature.

In aspects, the present disclosure further includes a method for drilling a curved borehole in a subterranean formation. The method may include forming a drill string, the drill string comprising: a drive shaft coupled to a drill bit, the drill bit configured to continuously rotate and penetrate within the subterranean formation; a drill string housing that houses the drive shaft, the drive shaft continuously rotating within the drill string housing relative to the drill string housing; a bearing assembly configured bear the drive shaft within the drill string housing, the bearing assembly comprising a bearing surface having a curvature; and penetrating the subterranean formation with the drill string; and drilling the curved borehole with the drill string.

Examples of certain features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 5A illustrates the FIG. 2 embodiment in a section of a drill string providing an adjustable amount of tilt for a drive shaft in accordance with one embodiment of the present disclosure, the tilt is displayed in a straight position;

FIG. 5B illustrates the FIG. 2 embodiment in a section of a drill string providing an adjustable amount of tilt for a drive shaft in accordance with one embodiment of the present disclosure, the tilt is displayed in an inclined position;

FIGS. 14A-D illustrate the operation of the 13 embodiment when encountering no displacement, axial displacement, angular displacement and a combined axial and angular displacement, respectively.

DETAILED DESCRIPTION OF THE DISCLOSURE

As will be appreciated from the discussion below, aspects of the present disclosure provide a steerable system for drilling wellbores. In general, the described steering methodology involves deflecting the angle of the drill bit axis relative to the longitudinal tool axis.

Figure 1:
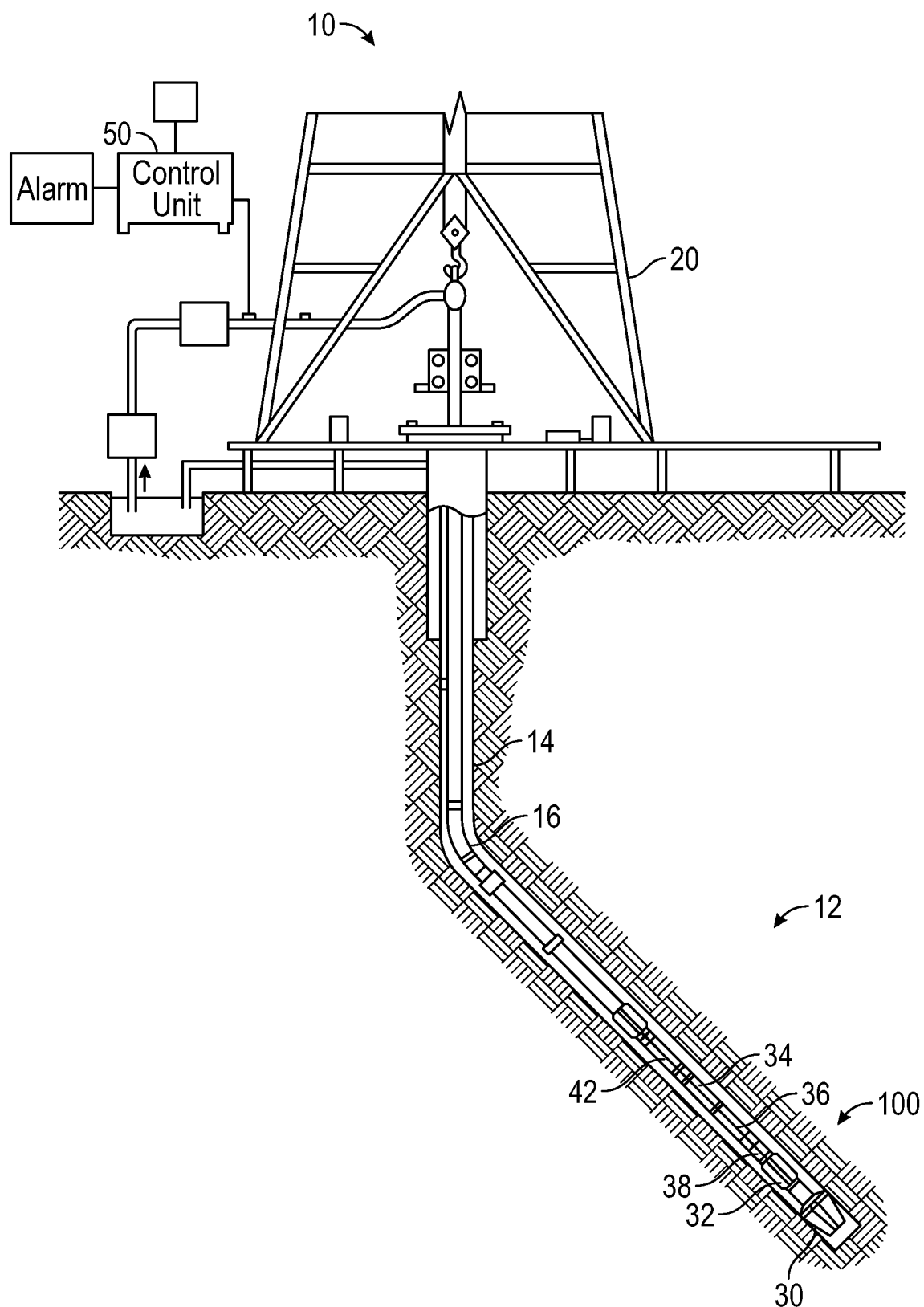
FIG. 1 illustrates a drilling system made in accordance with one embodiment of the present disclosure.

Referring now to FIG. 1, there is shown one illustrative embodiment of a drilling system 10 utilizing a steerable drilling assembly or bottomhole assembly (BHA) 12 for directionally drilling a wellbore 14. While a land-based rig is shown, these concepts and the methods are equally applicable to offshore drilling systems. The system 10 may include a drill string 16 suspended from a rig 20. The drill string 16, which may be jointed tubulars or coiled tubing (not shown), may include power and/or data conductors (not shown) such as wires for providing bidirectional communication and power transmission. In one configuration, the BHA 12 includes a drill bit 30, a sensor sub 32, a communication and/or power module 34, a formation evaluation sub 36, and one or more rotary power devices 38 such as drilling motors (e.g. electrical motors or mud motors). The sensor sub 32 may include sensors and tools for measuring a direction of at least a part of the drill string 16 and/or BHA (e.g., BHA azimuth, inclination, toolface, and/or BHA coordinates, etc.). The sensors and tools may be positioned relatively close to the drill bit 30 for measuring near-bit direction or near-bit position. The sensors and tools may be configured for making measurements while the drill string 16 is rotationally stationary or while the drill string 16 is rotating to generate stationary or rotary directional surveys, respectively. The sensor sub 32 may include two (2) or three (3) axis accelerometers, magnetometers, gyroscopic devices and signal processing circuitry. The system may also include information processing devices such as a control unit 50 (aka surface controller) and/or one or more downhole controller 42. The drill bit 30 may be rotated by rotating the drill string 16 from the surface and/or by using a downhole drilling motor, or other suitable rotary power device 38. By downhole drilling motor, it is meant mud motors, turbines, electrically powered motors, etc.

Communication between the control unit 50 and the BHA 12 may use uplinks and/or downlinks generated by a mud-driven alternator, a mud pulser, a mud siren, or a mud valve as known in the art, and conveyed using the drilling fluid column. Alternatively or in addition, uplinks and/or downlinks may be conveyed using acoustic conductors, electric conductors (e.g., hard wires), electromagnetic transmitter/receiver and/or optical conductors (e.g., optical fibers). The signals used for communication may be drilling fluid pressure variations, drilling fluid flow variations, acoustic signals, electric/electromagnetic signals including radio-frequency signals, and/or optical signals.

The BHA 12 may also include a steering system configured to adjust or control a direction of at least a part of the BHA 12 to drill wellbore 14 into a desired direction. Examples of steering assemblies are tilted motors, kickoff motors, adjustable kickoff motors, tilted drive shafts, or rotary steerable systems. As will be discussed in greater detail below, the BHA 12 may include a self-aligning bearing assembly that reduces wear of bearings during directional drilling and other situations.

Figure 2:
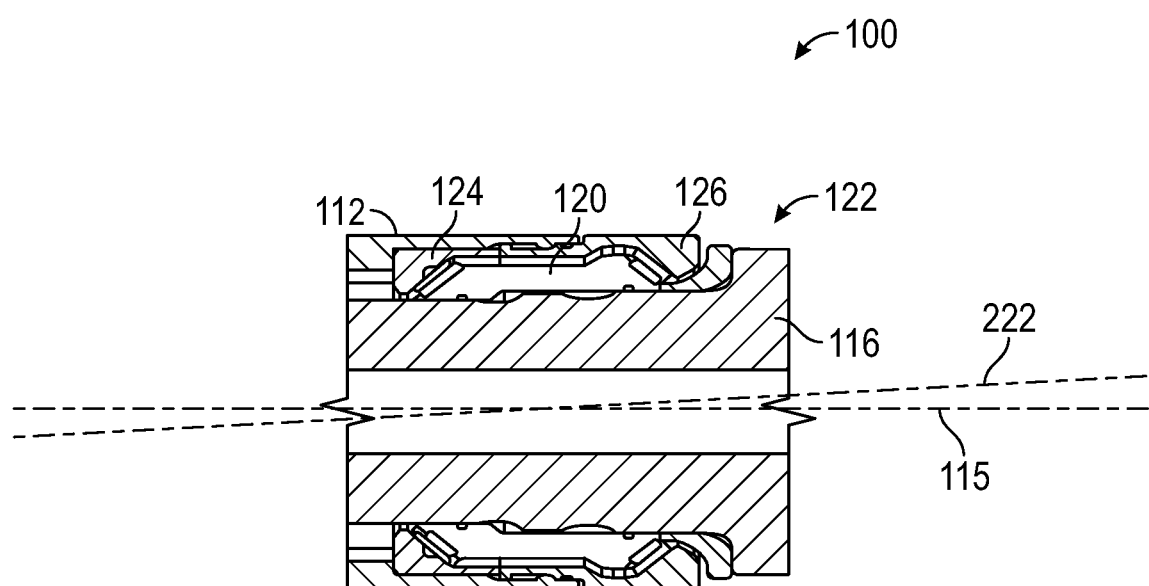
FIG. 2 schematically illustrates a self-aligning bearing assembly made in accordance with one embodiment of the present disclosure.

Referring to FIG. 2, there is sectionally illustrated a self-aligning bearing assembly 100 for directionally drilling a borehole in a subterranean formation. The term "self-aligning" in this context means that the bearing assembly is configured to adjust its direction in response to forces applied to the bearing assembly. In aspects, the forces applied to the bearing assembly may be caused only by rotating, drilling, bending, or putting axial weight on the bit. In aspects, the term "self-aligning" in this context means that the bearing assembly is configured to adjust its direction in response to forces applied to the bearing assembly in a passive way. The term "in a passive way" in this context means that the bearing assembly is configured to adjust its direction in response to forces applied to the bearing assembly without adding energy to the adjustment other than the forces that are caused only by rotating, drilling, bending, or putting axial weight on the bit. The bearing assembly 100 may be positioned in a section 112 of a drill string 16 (FIG. 1). The section 112 may be subjected to intentional or unintentional misalignment occurring between a shaft or other torque transmitting member 116 and the section 112. The torque transmitting member 116 may have a rotational axis 115 and the section 112 of the drill string 16 may have a rotational axis 222 which may be inclined with respect to each other. For example rotational axis 115 may be rotated with respect to rotational axis 224 about an axis that is perpendicular to rotational axis 115 or rotational axis 224. In one embodiment, the bearing assembly 100 includes an inner bearing structure 120 and an outer bearing structure 122. In one non-limiting embodiment, the outer bearing structure 122 can include mating sections 124, 126. As will be described in greater detail below, the inner bearing structure 120 and the outer bearing structure 122 rotationally slide relative to one another about an axis that is perpendicular to the rotational axis 115 or rotational axis 224 to accommodate shaft misalignments while bearing both axial and radial loading. Advantageously, these misalignments are accommodated while maintaining contact over a large surface area between the contacting and dynamically moving bearing surfaces during continuous rotation about the rotational axis 115 of the torque transmitting member 116 or the rotational axis of section 112 of the drill string. This large contact surface helps to reduce specific surface loading by engaging over a distributed area as opposed to a point loading, which can be damaging.

In the embodiments of this disclosure, axial bearing and thrust bearing have the same broad meaning. Axial or thrust bearings prevent movement along a rotation axis while at the same time allow rotation about that rotation axis. Similarly, in the embodiments of this disclosure, the terms radial bearing and journal bearing have the same broad meaning. Radial or journal bearings prevent movement perpendicular to a rotation axis while at the same time allow rotation about the rotation axis. Consequently, the terms "axial" bearing and "thrust" bearing will be used interchangeably in that broad meaning and the terms "radial" and "journal" bearings will be used interchangeably in that broad meaning. For example, the terms "axial" or "thrust" bearings as used herein may comprise bearings with sliding surfaces that are not perpendicular to the rotation axis but may be tapered or tilted with respect to the rotation axis and may comprise sliding surfaces that are plane or curved such as spherical, toroidal, or elliptical surfaces. The terms "curved surface", "surface with curvature", or "surface having a curvature", as used herein, refer to surfaces that are at least partially not plane, linear, or straight. Further, the terms "radial" or "journal" bearings as used herein may comprise bearings with sliding surfaces that are not cylindrical with respect to the rotation axis and may comprise sliding surfaces that are tapered, tilted, or curved with respect to the rotation axis. Moreover, the terms "axial", "thrust", "radial", or "journal" bearings may also be understood to comprise more than one bearing or more than one pair of sliding surfaces. The terms "lower", "downward", "downhole", etc. and "upper", "upward", "uphole", etc. respectively describe axial directions along the wellbore 14 (FIG. 1) towards or away from drill bit 30 (FIG. 1).

Figure 3:
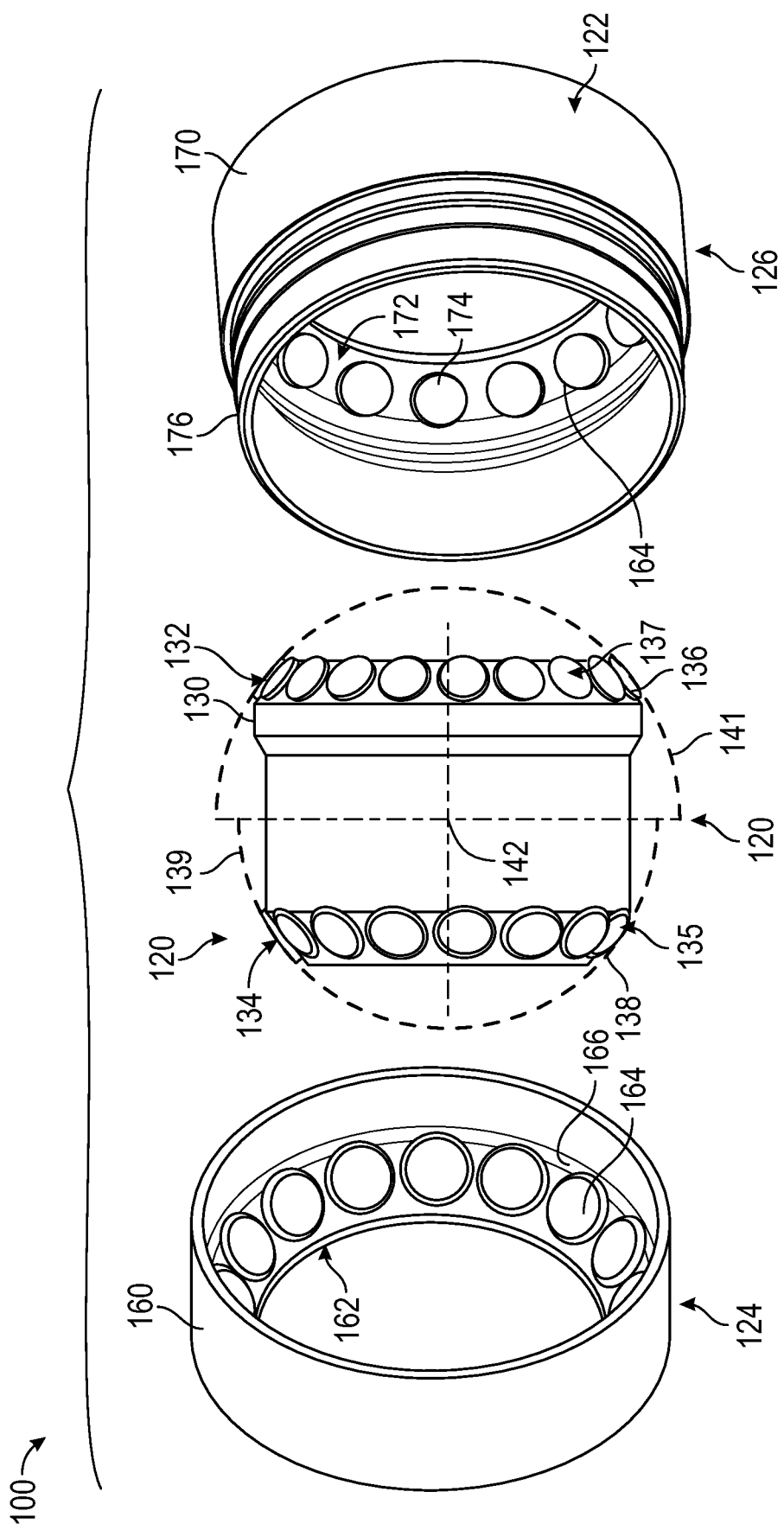
FIG. 3 schematically illustrates an "exploded" view of the FIG. 2 embodiment.

Referring to FIG. 3, there is shown the bearing assembly 100 in an "exploded" format. In one non-limiting embodiment, the inner bearing structure 120 includes a mandrel 130, which may be a rigid tubular member, and a bearing surface 132 that may be formed by a plurality of inserts 134. Mandrel 130 is coupled to torque transmitting member 116 and locked with respect to rotation in at least one direction relative to torque transmitting member 116. That is, rotation of mandrel 130 relative to torque transmitting member 116 is restricted in at least one direction. Locking with respect to rotation can be accomplished by screwing, gluing, welding, or clamping mandrel 130 to torque transmitting member 116 or by using one or more shoulders or keys, such as parallel keys to restrict the rotation. The bearing surface 132 is not parallel to the rotational axis of mandrel 130 and not perpendicular to the rotational axis of the mandrel 130 and, thus, allows to support axial loads as well as radial loads. In the configuration shown in FIG. 3, the bearing surface is at an angle with respect to the rotational axis of the mandrel 130 that is approximately between 40° and 50° to allow bearing of comparable loads from both, radial and axial directions, simultaneously at the same time. Depending on the angle of inclination of the bearing surface 132 with respect to the rotational axis of bearing assembly 100, the bearing can be optimized for axial support, radial support or any combination thereof. For a combined axial and radial bearing surface, the angular offset is between 0° and 90°, for example between 10° and 80°, or even between 20° and 70° if substantial loads from both, radial loads and axial loads, are taken by the bearing surface 132 at the same time. The inserts 134 are circumferentially distributed on outer surfaces of opposing ends 136, 138 of the mandrel 130. Each insert 134 presents an outer spheroid surface that is defined by either a sphere 139 or a sphere 141. Both of the spheres 139, 141 share a center 142 inside of the bearing assembly 100. The sphere 139 defines a bearing surface 135 and the sphere 141 defines a bearing surface 137. Bearing surfaces 135 and 137 together are forming bearing surface 132. In other words, bearing surface 135 and bearing surface 137 have a convex shape that is defined by spheres 139 and 141. The bearing surface 135 of inserts 134 on the end 138 correspond to an outer spheroid surface defined by the sphere 139 and bearing surface 137 of the inserts 134 on the end 136 correspond to an outer spheroid surface defined by the sphere 141. Alternatively, instead of utilizing inserts as sliding members, other, preferably hard or super hard surfaces might be utilized for the bearing function. To enhance performance and service life, bearing surfaces, such as opposing surfaces of spherical bearing surfaces with convex and respectively concave shape may include surface treatments and features, including but not limited to flame spray coatings, high velocity oxygen fuel (HVOF) spray coatings, laser weld coatings, ceramic inserts, tungsten carbide inserts (T2A), and diamond bearing elements to reduce abrasive wear. Such coatings or inserts may be characterized by the convex shape of bearing surfaces that are defined by spheres as explained above. FIG. 3 exemplary illustrates inserts, such as diamond bearing elements 134, also referred to as polycrystalline diamond compact (PDC) bearing elements (inserts) that may be distributed on bearing surfaces described herein to provide greater resistance to wear. Figures of this application are exemplary showing inserts. It shall be appreciated, that instead of inserts, other sliding members and surfaces could be used to fulfill the same function.

The outer bearing structure 122 may include a first section 124 and a second section 126. The first section 124 includes a mandrel 160, which may be a rigid tubular member, and a bearing surface 162 that may be formed by a plurality of inserts 164 circumferentially distributed on an inner surface 166. Likewise, the second section 126 includes a mandrel 170, which may be a rigid tubular member, and a bearing surface 172 that may be formed by a plurality of inserts 164 circumferentially distributed on an inner surface 174. Mandrels 160, 170 are coupled to section 112 and locked with respect to rotation in at least one direction relative to section 112. That is, rotation of mandrels 160, 170 relative to section 112 is restricted in at least one direction. Locking with respect to rotation can be accomplished by screwing, gluing, welding, or clamping mandrels 160, 170 to section 112 or by using one or more shoulders or keys, such as parallel keys to restrict the rotation. The first section 124 and the second section 126 may connect at a connector section 176, which may be a threaded connection or other mechanical connection such as a glued or welded connection or by means of additional components such as screws or clamps. For assembly purposes, the inner diameters of mandrels 160 and 170 are equal or greater than the maximum inner diameter of mandrel 130.

A bearing surface 162, which is formed by the inserts 164 of first and second section sections 124, 126, are defined by the spheres 139, 141, respectively. All points defining the bearing surface 162 on the first section 124 have the same distance to the center point 142. Likewise, all points defining the bearing surface 172 on the second section 126 have the same distance to the center point 142. This means that the contact area of inserts 164 and 134 have a shape of a spherical cap. The shape of the spherical cap is machined directly into the bearing surfaces of inserts 164 and 134 by grinding or milling. Because the bearing surfaces 135, 162 have a complementary spheroid shape and the bearing surfaces 137, 172 have a complementary spheroid shape and because the spheroid shapes have a common center point 142, the bearing surfaces 135 and 162 as well as 137 and 172 can slide in a ball and socket fashion. The spheres 139, 141 can have different diameters but share the same center point. While the sphere 139 has a smaller diameter than the sphere 141 in the illustrated embodiment, both can have the same diameters or sphere 141 can have a smaller diameter than sphere 139. Still, in all cases the spheres share the same center point or substantially the same center point. "Substantially the same center point" in this context means that in case sphere 139 has a different center point than sphere 141, the distance of these center points is small compared to the diameters of spheres 141 and 139, e.g. the distance of these center points is smaller than 10% of the diameters of spheres 141 and 139. The common center point 142 enables a sliding action between the bearing surfaces 135 and the bearing surfaces 162 and between bearing surfaces 137 and bearing surface 172 in a ball joint fashion inside the bearing assembly 100. The point of bearing tilt is defined at the center point 142. Due to the spherical curvature of inserts 164 and 134, the contacting surfaces of inserts 164 and 134 are contacting over an area rather that at a point or a line. For instance, the contacting surfaces are contacting over an area that is higher than 10% of the surface area of the insert, such as 50% of the surface area of the insert or even 80% of the surface area of the insert.

Figure 4:
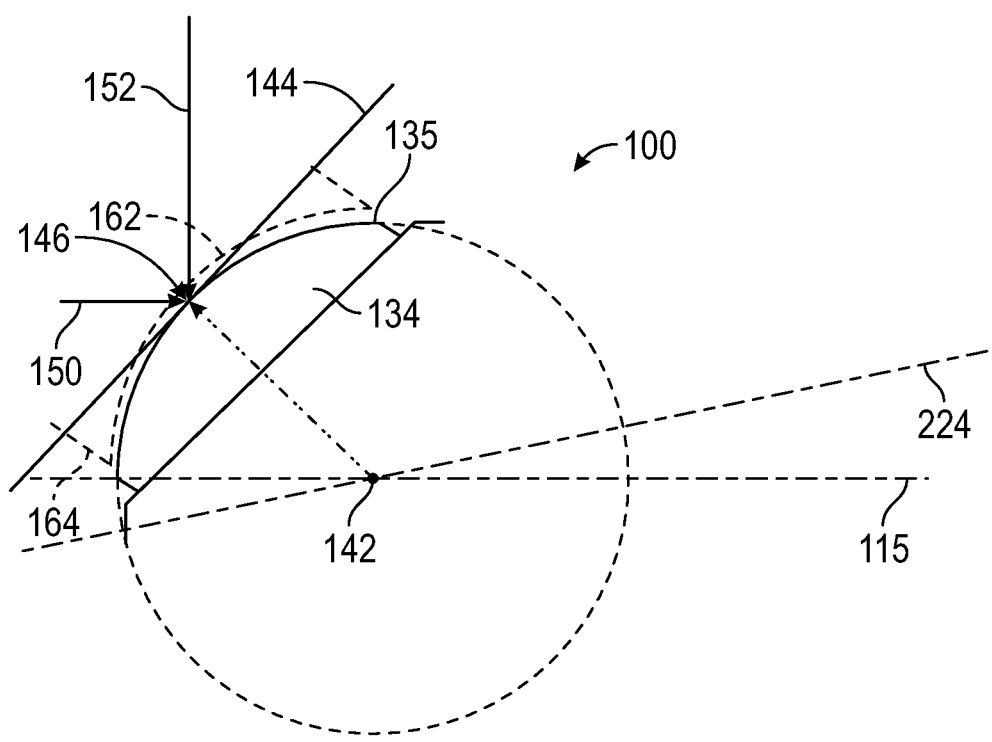
FIG. 4 illustrates an insert having a spheroid bearing surface made in accordance with one embodiment of the present disclosure.

Referring to FIG. 4, there is shown the insert 134 in contact with the insert 164, which is shown in hidden lines. The contour of the bearing surfaces 135, 162 is in highly exaggerated form to better illustrate the curvature. The bearing surfaces 135, 162 conform to a surface of a sphere; i.e., all points defining each bearing surfaces 135, 162 have substantially the same distance to a common center point 142. The common center point 142 is the pivoting point at the intersection of the rotational axis 115 and the rotational axis 224, which is discussed in connection with FIG. 5B. Thus, the bearing surfaces 135, 162 have curvatures in three dimensions. It should be noted that the bearing surface 135 may be considered discontinuous or segmented because it can be made up of the surfaces of a plurality of separate inserts 134. This means that the surface areas of inserts 134 have a shape of a spherical cap. The shape of the spherical cap is machined directly into the bearing surfaces of inserts 134 by grinding or milling. It should also be noted that while a spheroid shape defines each bearing surface 135, 162, the nature of the curvatures may be considered opposing in order to allow continuous contact between the two bearing surfaces 135, 162. In one aspect, the bearing surface 135 may be considered convex and the bearing surface 162 may be considered concave, both in a three dimensional fashion. The distance between the bearing surfaces 135, 162 defines the bearing play. The nature of sliding bearings for use in downhole drilling and for use in abrasive loaded media such as drilling mud, demands some minimum bearing play. The bearing play may be in the range of up to one mm, e.g. between 0.03 mm and 0.8 mm, or even better defined in a range of 0.1 mm to 0.2 mm. When a force is applied, sliding surfaces come into contact and the gap closes towards the load applied direction.

It should be appreciated that the above-described features enable the bearing assembly to maintain alignment between the contacting bearing surfaces by using the center point 142 inside the bearing assembly 100 as a pivot point for the aligning movement. In this context, "maintaining alignment" means that the contacting surfaces are contacting over an area instead of at a point. For instance, the contacting surfaces are contacting over an area that is higher than 10% of the surface area of the insert, such as 50% of the surface area of the insert or even 80% of the surface area of the insert.

Additionally, it should be noted that a tangent 144 at the apex 146 of the bearing surface 135 is non-parallel with a rotational axis 115 (FIG. 2) of the drill string section or housing. The tangent 144 may have any angular offset. The angular offset allows the bearing surface 135 of inserts 134, 164 to bear axial loadings 150 and radial loadings 152 at the same time. For an ideal radial bearing, the angular offset is 0° while for an ideal axial bearing the angular offset is 90°. For a combined axial and radial bearing surface, the angular offset is between 0° and 90°, for example between 10° and 80°, or even between 20° and 70° if substantial loads from both, radial loads and axial loads, are taken by the bearing surface 135 at the same time.

To enhance performance and service life, bearing surfaces, such as bearing surfaces 135, 162 may have surface treatments and features that include, but are not limited to, HVOF spray coatings, laser weld coatings, ceramic inserts, and tungsten carbide inserts (T2A) to reduce abrasive wear. Alternatively bearing surfaces can be formed from inserts (e.g. inserts 134 in FIG. 3), preferably from hard or superhard inserts such as diamond bearing elements, also referred to as polycrystalline diamond compact (PDC) bearing elements (inserts) that may be distributed along bearing surfaces described herein to provide greater resistance to wear. Again alternatively, those inserts may be made from ceramic such as polycrystalline cubic boron nitride (PCBN).

Referring to FIGS. 5A, B, there is shown one non-limiting embodiment of a drilling assembly 300 (also known as bottomhole assembly 300) that incorporates the self-aligning bearing assembly 100. As noted previously, the self-aligning bearing assembly 100 can bear radial and thrust loading with similar effectiveness and allows pitching and yawing degree of freedom (omni-directional tilt) of the rotating and non-rotating bearing elements. In FIG. 5A, the drive shaft 218 is disposed within a drill string housing 220 that houses the drive shaft 218. Drive shaft 218 continuously rotates inside the drill string housing 220 and relative to the drill string housing 220 and does not have an intentional or unintentional deflection relative to the drill string housing 220. "Continuous rotation" in this context means rotation by at least one full circumference. Thus, the rotational axis 222 of the drill string housing 220 is aligned with the rotational axis 224 of the drive shaft 218 below bearing assembly 100. In this assembly, mandrel 130 of bearing assembly 100 is coupled to drive shaft 218 and locked with respect to rotation in at least one direction relative to the drive shaft 218. That is, rotation of mandrel 130 relative to drive shaft 218 is restricted in at least one direction. Locking with respect to rotation can be accomplished by screwing, gluing, welding, or clamping mandrel 130 to drive shaft 218 or by using one or more shoulders or keys, such as parallel keys to restrict the rotation. Mandrels 160, 170 are coupled to drill string using 220 and locked with respect to rotation in at least one direction relative to drill string housing 220. That is, rotation of mandrels 160, 170 relative to drill string housing 220 is restricted in at least one direction. Locking with respect to rotation can be accomplished by screwing, gluing, welding, or clamping mandrels 160, 170 to drill string housing or by using one or more shoulders or keys, such as parallel keys to restrict the rotation.

Figure 5C:
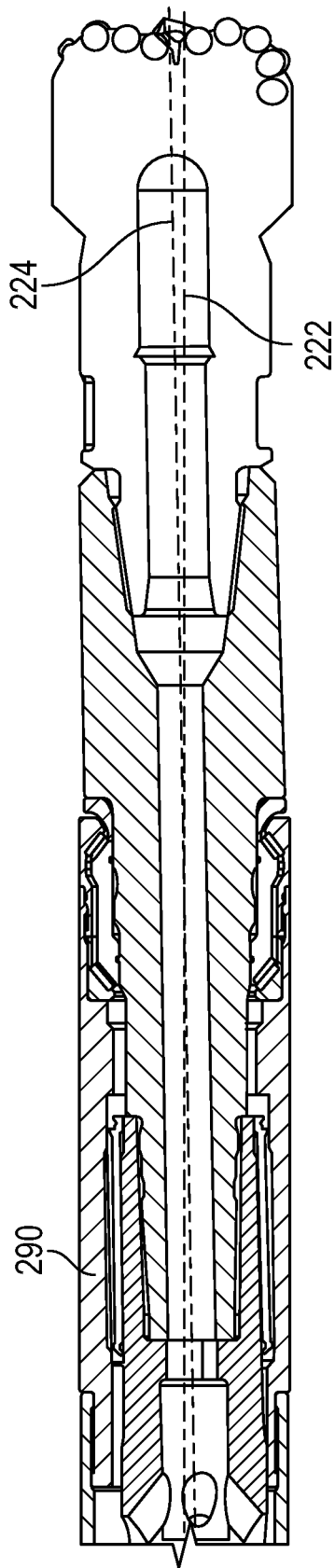
FIG. 5C illustrates the FIG. 2 embodiment in a section of a drill string in accordance with one embodiment of the present disclosure

Bearing assemblies according to the present disclosure may be used in a variety of configurations for downhole tools. One non-limiting configuration involves a downhole tool for directional drilling. In particular, the disclosed bearing assemblies may be used with steerable drilling systems that utilize a tilted drive shaft (FIGS. 5A-F). In FIG. 5A, B, there is shown a drill string housing 220 of a bottomhole assembly 300 (FIG. 1) where a drive shaft 218 is located inside the drill string housing 220, and the bearing assembly 100. Drive shaft 218 may be made out of several parts that are joined together, for example by thread 219 or other means, such as screws, clamps, or connections that are welded or glued. A mechanical connection above bearing assembly 100 may facilitate exchange of bearing assembly 100 if bearing assembly 100 was subject to excessive wear. Drive shaft 218 is connected to drill bit 30 and configured to be continuously rotated, e.g. by a downhole drilling motor (not shown) that is further up in the drill string or a so-called top drive at the earth's surface. In FIG. 5A, the rotational axis 222 of the drill string housing 220 is shown which is aligned with rotational axis 224 of the drive shaft 218. FIG. 5B shows the same section of a bottomhole assembly 300 that is adjusted in a way that the rotational axis 224 of the drive shaft 218 is tilted with respect the rotational axis 222 of the drill string housing 220. Tilting the drive shaft 218 can be used for a device usable for directional drilling. When the drill bit is rotated by the motor only, the tilt effects a change in drilling direction by influencing the way the drill bit 30 and bottom hole assembly 12 lays in the previously drilled hole. The end effect is that the face 35 of the drill bit 30 points or tilts in a selected orientation for the selected new direction of the hole. FIG. 5A shows a section of a bottomhole assembly 300 with the tilt adjusted to a straight position. Such bottomhole assemblies can be used for drilling straight sections of a wellbore or as drive systems for other steering tools (for example, those referred to as Rotary Steerable Systems (RSS) for those skilled in the art) mounted below (between the device shown in FIGS. 5A-C and the drill bit 30). As explained in the following sections, the device according to FIGS. 5A and B can be continuously adjusted from a straight to a defined maximum tilt position. The adjustment is being done on surface before the device is lowered in the hole.

In embodiments, one or more components of the bottomhole assembly 300 may include one or more eccentricity members having an eccentricity or asymmetric geometry that causes a deflection of the drive shaft 218 and the drill bit 30 (FIG. 1) with respect to the rotational axis 222 of the drill string housing 220.

Referring now to FIG. 5C, the deflection may cause a tilt that is relatively fixed, e.g., by a tilt that cannot be adjusted without disassembling the bottomhole assembly 300 at the earth's surface, for instance, by using an eccentricity member 290 constructed to have a wall thickness asymmetric with respect to the rotational axis 222 of the drill string housing 220 that results in a constant angular offset of the rotational axis 224 of the drive shaft 218 with respect to rotational axis 222 of the drill string housing 220. In order to adjust the tilt to a different angle, such an assembly needs to be disassembled to exchange the eccentric member 290 with one that has a different eccentricity and thus causes a different tilt. A higher tilt would be beneficial to drill narrower curvatures, while a smaller tilt would be beneficial to drill straighter sections or do corrections only. Advantageously, the self-aligning bearing assembly 100 reduces potential damage to bearing surfaces from misalignment. Advantageously, the self-aligning bearing assembly 100 orients according to the tilt as described previously. Also, identical components can be used for bearing assembly 100 regardless of the adjusted tilt.

Referring further to FIG. 5A-F, in embodiments, the bottomhole assembly 300 may be configured to have an adjustable tilt; e.g., a tilt axis adjustable between a nominal or no tilt and about 1°, or a higher value such as 5°. FIGS. 5A, B and D-F illustrate an adjustable alignment assembly 402 that uses two or more eccentric members to vary the tilt angle. The two eccentric members may move relative to one another such that their eccentricities either offset one another to minimize a tilt angle or complement one another to maximize tilt angle. Of course, the eccentricities may also be set to provide an intermediate tilt angle value.

In embodiments, an upper bearing 400 may be configured to have an adjustable tilt; e.g., a tilt axis adjustable between no tilt and a tilt of about 1°, or a higher value such as 5°. FIGS. 5A, B and D-F illustrate an upper bearing 400 that uses two or more eccentricity members to vary the tilt angle. The two components may move relative to one another such that the eccentricities either offset one another to minimize a tilt angle or complement one another to maximize tilt angle. Of course, the eccentricities may also be set to provide an intermediate tilt angle value.

Referring to FIGS. 5A, B and D-F, in one non-limiting embodiment, the upper bearing 400 generates a first eccentricity using a bearing housing 410 having an eccentric inner surface, creating the first eccentricity member. The bearing housing 410 includes an inner contour 420 that is eccentric and/or at an angle with respect to the rotational axis 222 of the drill string housing 220. For example, as shown in FIG. 5B, the bearing housing 410 includes an inner contour 420 that is eccentric and/or at an angle with respect to an outer contour 422 of the housing wall such that a first enlarged portion 423 is formed, hence bearing housing 410 has one side with an enlarged wall thickness and one opposite side with a narrower wall thickness. The eccentric and/or asymmetric inner contour 420 of bearing housing 410 is complementary to the female radial bearing 424. Referring to FIGS. 5A, B and E-F, another eccentric and/or asymmetric eccentricity member is formed using a female radial bearing 424 with an outer contour 416 that is eccentric to the inner radial bearing surface 418 and configured to bear drive shaft 218. Thus, the female radial bearing 424 has a first side with an enlarged wall portion 425 and an opposing side with a narrower wall thickness 426. The female radial bearing 424 can be rotated and positioned inside the contour 420 and hence relative to the bearing housing 410 about its center line by means of a keyed connection 431 (FIG. 5E, F) between an upper housing 103 and the female radial bearing 424.

Referring further to FIGS. 5A and B, in one non-limiting configuration, the upper housing 103 and the bearing housing 410 are connected through a threaded portion 105. To adjust the tilt, the upper housing 103 is rotated about its rotational axis 222 of the drill string housing 220 with respect to the bearing housing 410. Referring to FIGS. 5A and B, one or more rings 430, or ring segments (for example, half shell rings) may be installed between upper housing 103 and bearing housing 410. Use of ring 430 with various widths may result in various distances between upper housing 103 and bearing housing 410 and consequently may lead to various eccentricity orientations when screwed together. Use of ring segments, such as half-shell rings allows to exchange rings, for example exchange rings with various thickness, without completely unscrewing threaded portion 105.

Figure 5D:
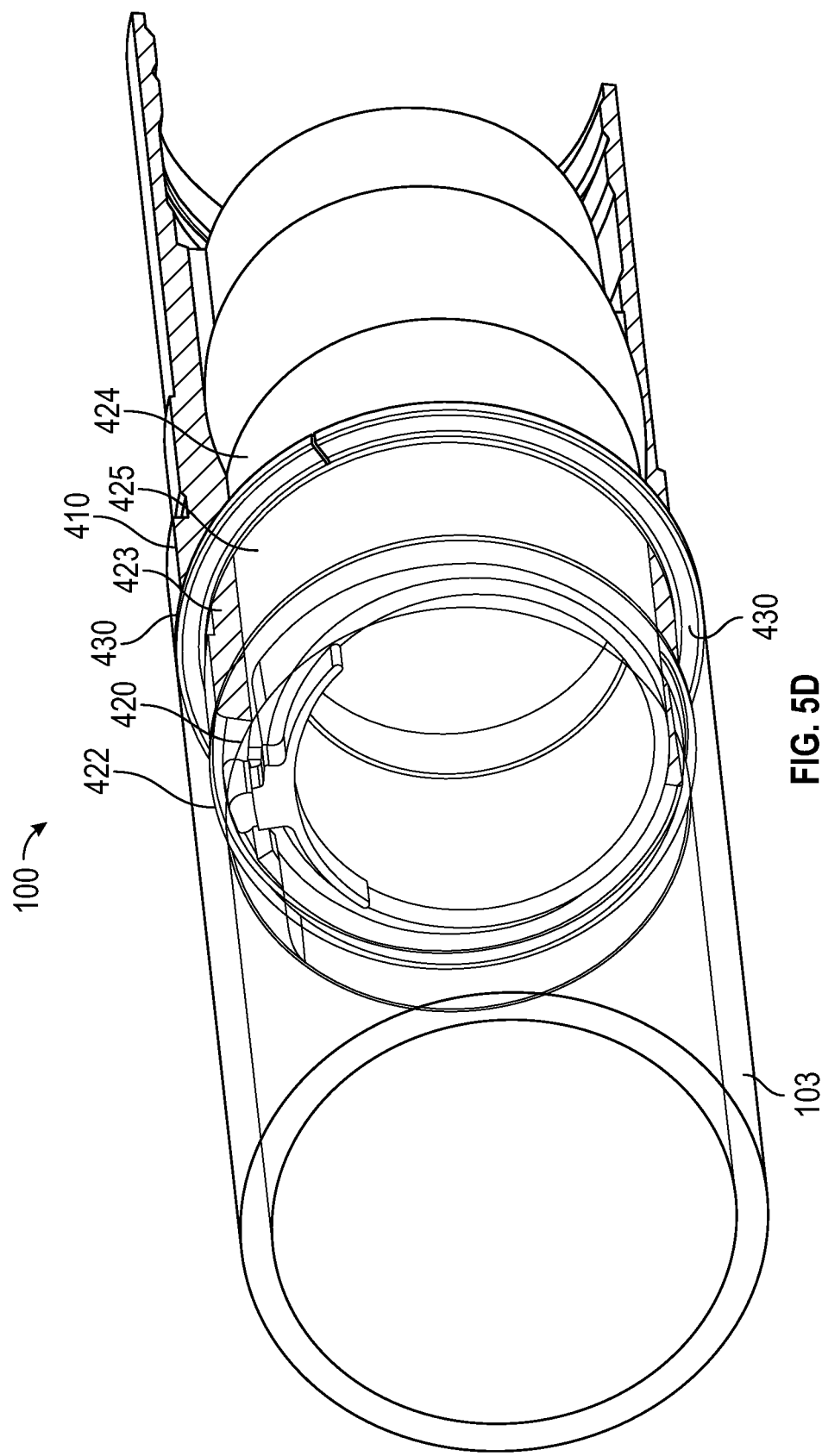
FIG. 5D illustrates an adjustable eccentric member for providing an adjustable amount of tilt for a drive shaft in accordance with one embodiment of the present disclosure with the tilt adjusted in an inclined position.
Figure 5E:
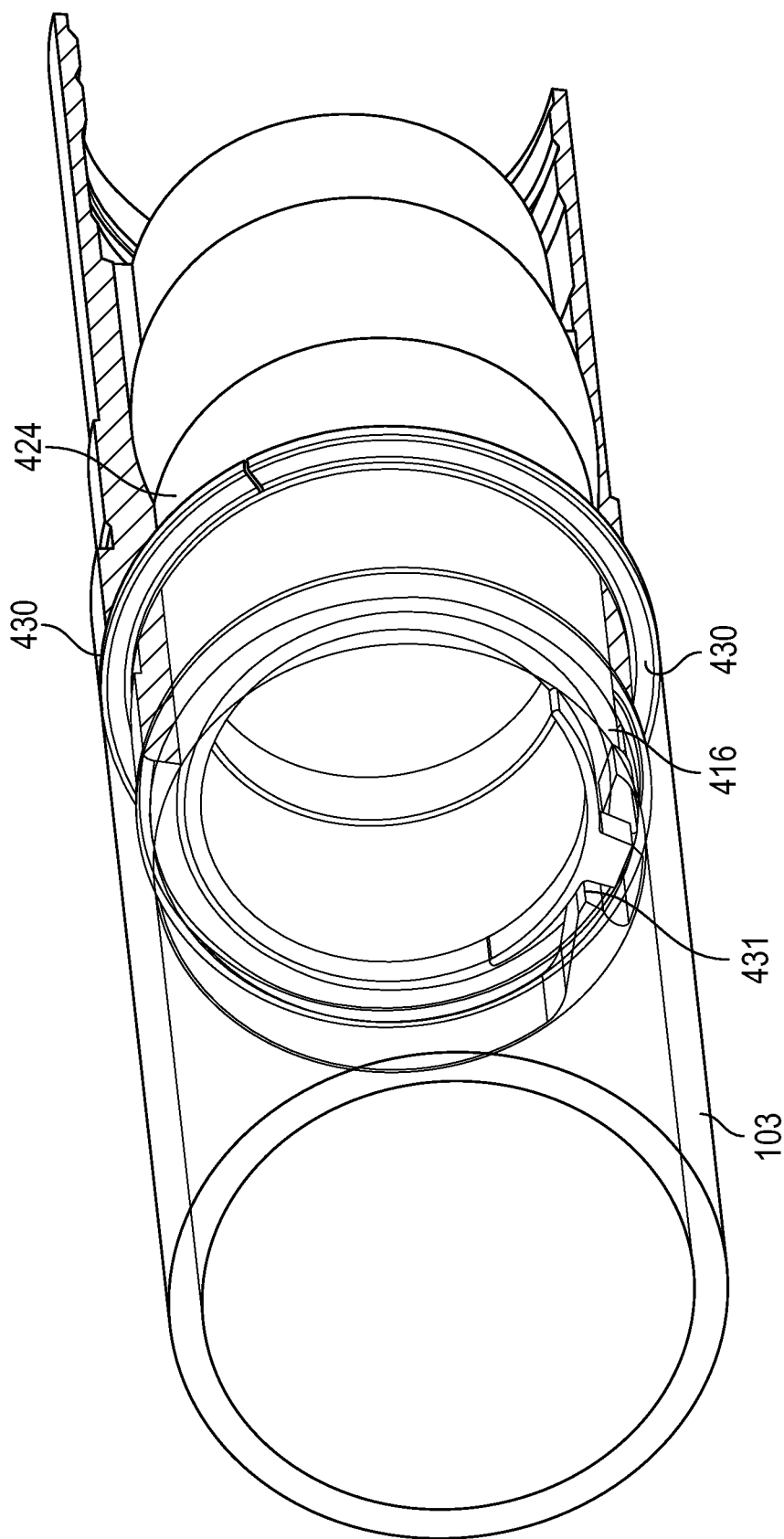
FIG. 5E illustrates an adjustable eccentric member for providing an adjustable amount of tilt for a drive shaft in accordance with one embodiment of the present disclosure with the tilt adjusted in a straight position.
Figure 5F:
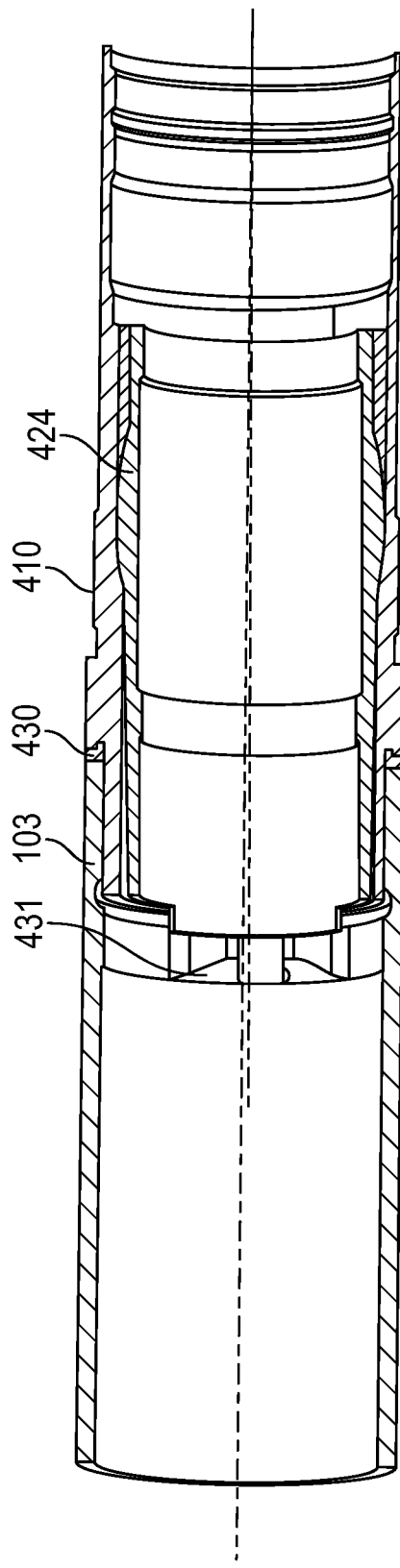
FIG. 5F illustrates a cross section of an adjustable eccentric member for providing an adjustable amount of tilt for a drive shaft in accordance with one embodiment of the present disclosure with the tilt adjusted in an intermediate position.

It is apparent, that with the pitch of the thread and by use of the one or more the one or more rings 430 clamped between the shoulders of upper housing 103 and bearing housing 410 the housings will have various azimuthal offsets with respect to each other when screwed together. For example, with a pitch of threaded portion 105 of 4 mm per revolution and with a width of the one or more rings 430 reduced by 1 mm, upper housing 103 and bearing housing 410 are rotated about 90° with respect to each other, thus reducing the tilt by rotation of the enlarged portions 423, 425. Referring to FIG. 5D, the maximum tilt created by aligning both enlarged portions 423, 425 towards the same side is exemplary set to 1° and the thread pitch of threaded portion 105 is 4 mm per revolution. A respective rotation of 180°, achieved by a reduction in thicknesses of the one or more ring 430 of 2 mm, would yield to a 0° tilt (straight assembly) as shown in FIG. 5A and in FIG. 5E.

FIG. 5B also shows the distance "bit to bend" from the point of intersection 447, where the two rotational axis 224 and 222 intersect, which is at the same or substantially the same location as common center point 142 defined by the spherical surface of the self-alignment bearing assembly 100 to the bit face 35 of the drill bit 30.

Thus, it should be appreciated that manipulation of the angle and/or the thickness of the one or more rings 430 and thus of the tilt angle can create and/or define a tilt in the bearing assembly 100. The bearing surfaces 162 and 132 allow for such adjustment without creating point or line contact in the actual sliding surfaces as explained earlier.

Figure 6A:
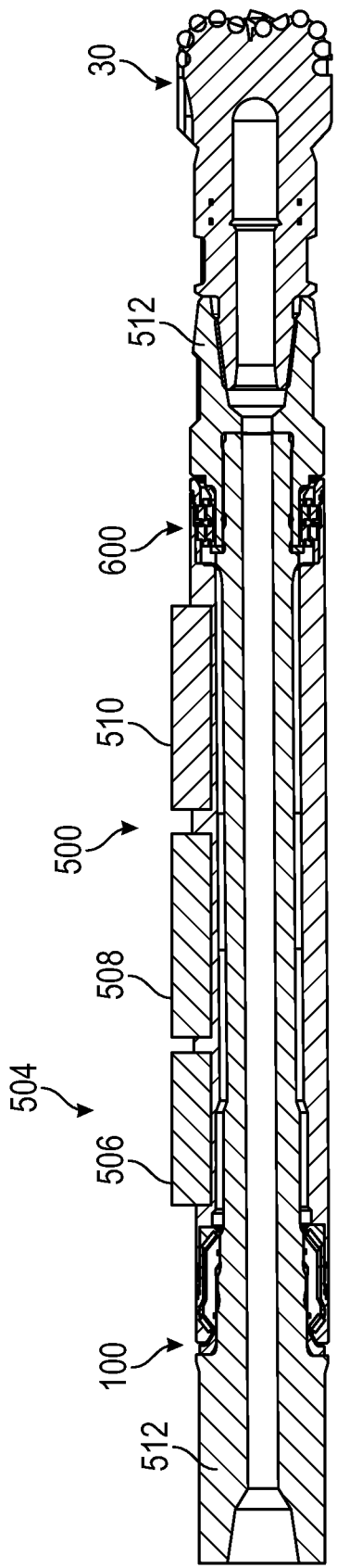
FIGS. 6A, B illustrate a drilling assembly that includes self-aligning bearing assemblies in accordance with embodiments of the present disclosure.
Figure 6B:
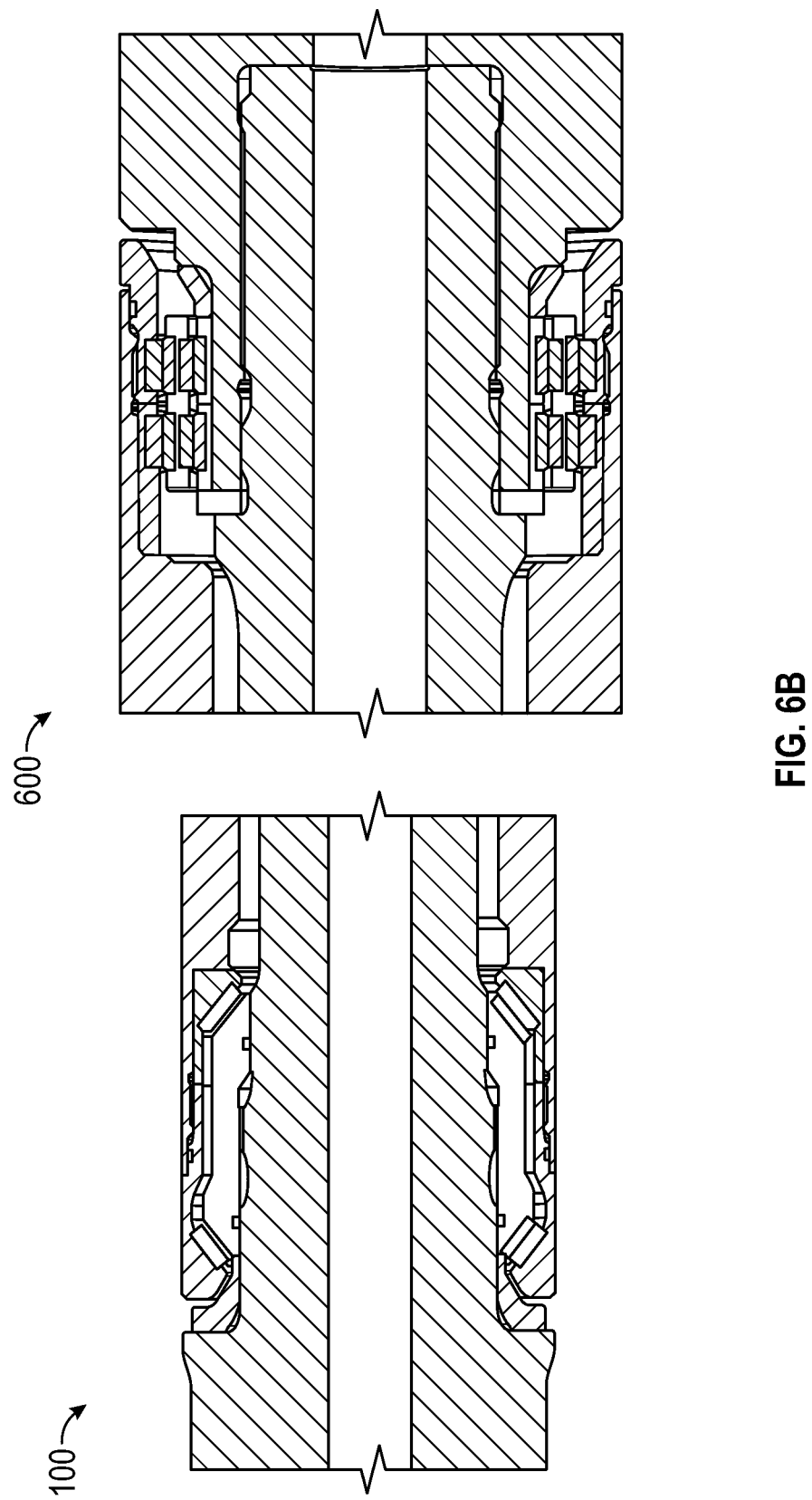

Referring to FIG. 6A, B, there is shown another embodiment of a drilling system 500 according to the present disclosure. The drilling system 500 may include a first self-alignment bearing 100 and a second alignment bearing 600. The drilling system 500 may also include a bottom hole assembly (BHA) that includes a drill bit 30 connected to and driven by a drive shaft 512 and a sleeve 504 that is rotatably coupled to drive shaft 512 (aka non-rotating sleeve). The sleeve 504 houses the drive shaft 512 (sleeve 504 is a drill string housing 504 for drive shaft 512 similar to drill string housing 220 for drive shaft 218) and the drive shaft 512 rotates within and relative to the sleeve 504. Sleeve 504 supports a bias module 510, an electronics and sensor module 508, and a communication module 506. Bias module 510 comprises one or more eccentricity members, such as actuators, that are configured to create a bias of sleeve 504, For example, bias module 510 may comprise actuators that can be engaged with the borehole wall to create radial forces on sleeve 504. This, in turn, will create radial forces on drive shaft 512 that may create deflection and/or misalignment of drive shaft 512 with respect to sleeve 504 via bearing 100 or bearing 600. Bias module 510 may be in communication with communication module 506 to receive commands based on which actuation will be controlled. It should be understood that the drilling system 500 is not limited to any particular configuration for a BHA.

The non-rotating sleeve 504 is supported by the first self-alignment bearing 100 and the second alignment bearing 600. The non-rotating sleeve 504 is considered "non-rotating" as it may be substantially stationary relative to a borehole wall. Irrespective of the term "non-rotating sleeve", there may be some slight rotation of the sleeve 504 due to inherent drilling dynamics and frictional contacts. The self-alignment bearing 100 supports axial and radial loadings as described previously. Therefore, the self-alignment bearing 100 axially positions the non-rotating sleeve 504 relative to drive shaft 512.

To prevent an axially over-confined situation, the second alignment bearing 600 is configured to support radial loadings, which may arise during drilling and steering, be self-aligning to account, for instance, for static and dynamic shaft deflection and for manufacturing tolerances, and axially free to some extent to accommodate axial misalignment within the bearing assembly. In both self-alignment bearings, some of the bearing surfaces are not parallel to the rotational axis 224, 222 of drive shaft 512 and/or sleeve 504 and not perpendicular to the rotational axis 224, 222 of drive shaft 512 and/or sleeve 504 and, thus, simultaneously allow to support axial loads as well as radial loads. In the configuration shown in FIGS. 6A, B, the bearing surface of self-alignment bearing 100 is at an angle with respect to the rotational axis 224, 222 of drive shaft 512 and sleeve 504 that is approximately between 40° and 50° to allow bearing of comparable loads from both, radial and axial directions, at the same time. In contrast, bearing surface of self-alignment bearing 600 is at an angle with respect to the rotational axis 224, 222 of drive shaft 512 and sleeve 504 that is much lower—approximately between 5° and 30° to allow bearing of loads mainly from axial directions, at the same time. Depending on the angle of inclination of the bearing surfaces with respect to the rotational axis of 224, 222 of drive shaft 512 and sleeve 504, the bearings can be optimized for axial support, radial support or any combination thereof. Irrespective of the actual angle of inclination, both bearings 100 and 600 have bearing surfaces that are inclined towards the axis of rotation in an upward direction and bearing surfaces that are inclined towards the axis of rotation in a downward direction to restrict axial movement in axial upward and downward direction as well as radial movement at the same time. However, this is not meant to be a restriction. Bearing where the bearing surface are inclined towards the rotational axis 224, 222 of drive shaft 512 and sleeve 504 only in upward direction or only in downward direction may also be used. Also, the angle of inclination does not need to be the same in a bearing assembly. Bearing assemblies can be used having bearing surfaces with different angles of inclination.

Figure 7:
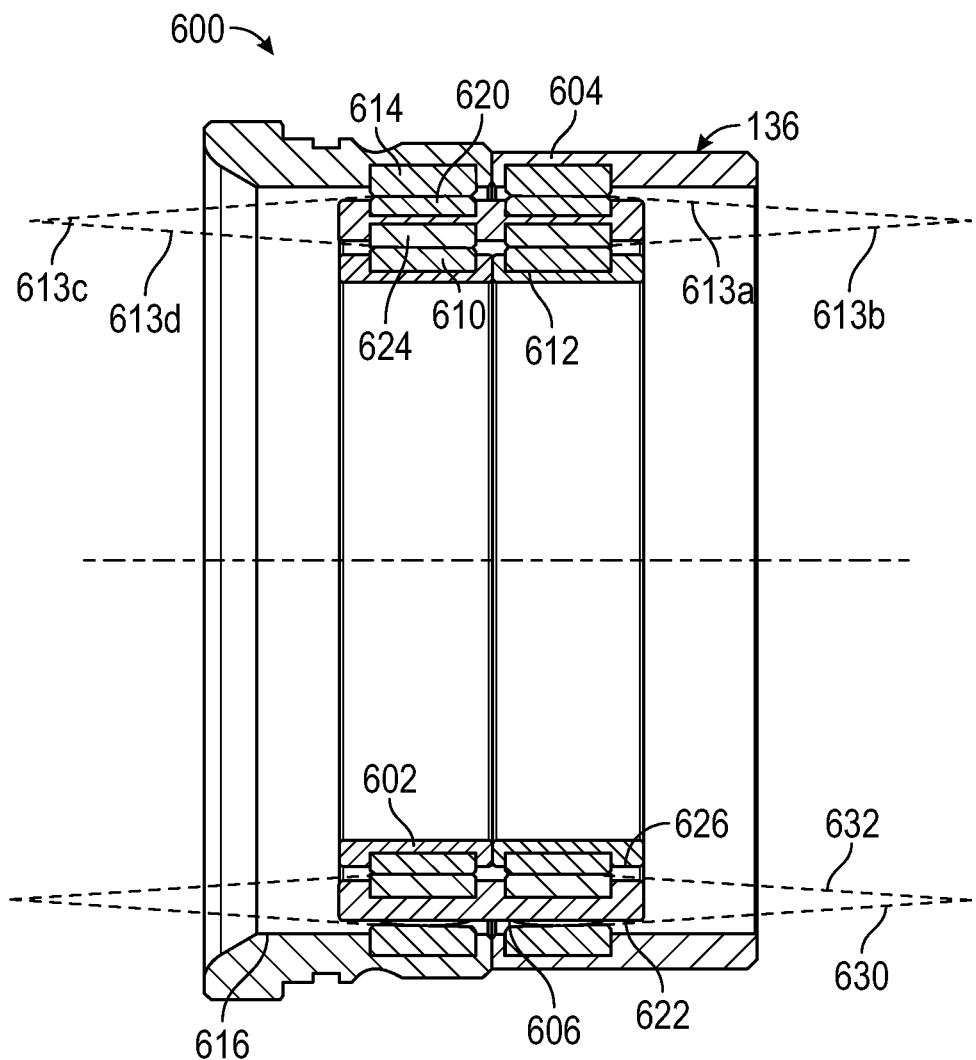
FIG. 7 illustrates a self-aligning bearing assembly in accordance with one embodiment of the present disclosure that uses spherical bearing surfaces.

Referring to FIG. 7, there is shown the alignment bearing 600 in greater detail. In one embodiment, the alignment bearing 600 includes an inner ring 602, an outer ring 604, and an intermediate ring 606. Outer ring 604 is coupled to drill string housing 220/504 and locked with respect to rotation in at least one direction relative to drill string housing 220/504. That is, rotation of outer ring 604 relative to drill string housing 220/504 is restricted in at least one direction. Locking with respect to rotation can be accomplished by screwing, gluing, welding, or clamping outer ring 604 to drill string housing 220/504 or by using one or more shoulders or keys, such as parallel keys to restrict the rotation. Likewise, inner ring 602 is coupled to drive shaft 218/512 and locked with respect to rotation in at least one direction relative to drive shaft 218/512. That is, rotation of inner ring 602 relative to drive shaft 218/512 is restricted in at least one direction. Locking with respect to rotation can be accomplished by screwing, gluing, welding, or clamping inner ring 602 to drive shaft 218/512 or by using one or more shoulders or keys, such as parallel keys to restrict the rotation.

The rings 602, 604, 606 are telescopically arranged and can, to some extent, slide axially, radially and angularly about an axis perpendicular to the rotational axis 222 of the drill string housing 220/504 or the rotational axis 224 of the drive shaft 218/512 relative to one another while still allowing continuous rotation (e.g. rotation about one or more circumferences) about the rotational axis 222 of the drill string housing 220/504 or the rotational axis 224 of the drive shaft 218/512 relative to each other. The mating surfaces of the rings 602, 604, and 606 are made using bearing surfaces formed by inserts. As explained above, also with the alignment bearing 600, to enhance performance and service life, bearing surfaces may have surface treatments and features that include, but are not limited to, HVOF spray coatings, laser weld coatings, ceramic inserts, and tungsten carbide inserts (T2A) to reduce abrasive wear. Alternatively bearing surfaces can be formed from inserts, preferably from hard or super-hard inserts such as diamond bearing elements (134), also referred to as polycrystalline diamond compact (PDC) bearing elements (inserts) that may be distributed on bearing surfaces described herein to provide greater resistance to wear. Again alternatively inserts may be made from ceramic such as polycrystalline cubic boron nitride (PCBN), and others.

The inner ring 602 includes inserts 610 circumferentially distributed on an outer surface 612 and the outer ring 604 has inserts 614 circumferentially distributed on an inner surface 616. The intermediate ring 606 includes inserts 620 circumferentially on an outer surface 622 and inserts 624 circumferentially distributed on an inner surface 626. The inserts 620 and 614 are arranged to slidingly engage one another and the inserts 624 and 610 are arranged to slidingly engage one another. While two rows of inserts are shown, other embodiments may include greater or fewer rows of inserts, or even closed sliding surfaces without inserts.

In one embodiment, the inserts 620, 614 and inserts 624, 610 share complementary curvatures. In one embodiment, the curvatures substantially conform to a surface of one or more spheres 613a, c or toroids 613b, d, i.e., are spherically or toroidically shaped. This means that the surface area of inserts 620, 614 and inserts 624, 610 have a shape of a spherical cap. The shape of the spherical cap is machined directly into the bearing surfaces of inserts 620, 614 and inserts 624, 610 by grinding or milling. The radii of the spheres/toroids 613a-613d are selected to support radial loads while having sufficient curvature to allow pivoting about an axis perpendicular to the rotational axis 222 of the drill string housing 220/504 or the rotational axis 115/224 of the drive shaft 218/512. Preferably the intermediate ring 606 has a spherical/toroid-like radius slightly smaller than the respective inner and outer spheres/toroids. The outer set of inserts 620, 614 may have a curvature 630 such that a radius defining the surfaces of the inserts 620, 614 projects toward a center of spheres 613a,c defining the curvature. The center of the spheres 613a,c may be located on the rotational axis 222 of the drill string housing 220/504 or the rotational axis 115/224 of the drive shaft 218/512 and may be located close to or at the center of alignment bearing 600. The inner set of inserts 624, 610 may have a curvature 632 such that a radius defining the surfaces of the inserts 624, 610 projects away from the rotational axis 222 of the drill string housing 220/504 or the rotational axis 115/224 of the drive shaft 218/512 and the alignment bearing 600. The pairing of the spheroid/toroid surfaces 613a-613d of the inserts 620, 614 and 624, 610 locks the intermediate ring 606 within the inner ring 602 and the outer ring 604. The curvature of the inserts 620, 624 may be considered convex and curvatures of the inserts 614, 610 may be considered concave. Thus, in one aspect, inserts 620, 624 may be considered to have bearing surfaces with curvatures that are opposing to those of inserts 614, 610. Although not shown, it should be noted that the spheres 613a and 613c may have different radii. For example, radius of sphere 613a may be larger or smaller than radius of sphere 613c. Likewise, the radii of toroids 613d and 613b may be different. For example, radius of toroid 613d may be larger or smaller than radius of sphere 613b. Also, it should be noted that opposing inserts such as inserts 610 and 624 may have different sizes. For example, inserts 610 may be larger or smaller than insert 624. In particular, opposing inserts may have different surface areas which may be advantageous depending on the configuration. Further, it should be noted that the curvature are in three dimensions because the curvatures 630, 632 are spherical in shape. Thus, the term "complementary curvatures" refers to curvatures that allow surfaces defined by such curvatures to physically engage and slide against one another over an area, as opposed to a point. In aspects, the area is substantially a majority of the bearing surface of the inserts 614, 610 and 624, 610. Thus, in the illustrated embodiment, the insert 610 has a surface with a curvature that is complementary to curvature defining the surface of the insert 624. In this illustrated embodiment, the complementary configuration is obtained by pairing a convex surface with a concave surface. It should be noted that the inner ring 602, the intermediate ring 606 and/or the outer ring 604 may comprise two single rings for assembly purposes (only shown for outer ring 604 and inner ring 602 in FIG. 7. The two single rings are hold together during operation by retaining elements such as screws and clamps.

Figure 8A:
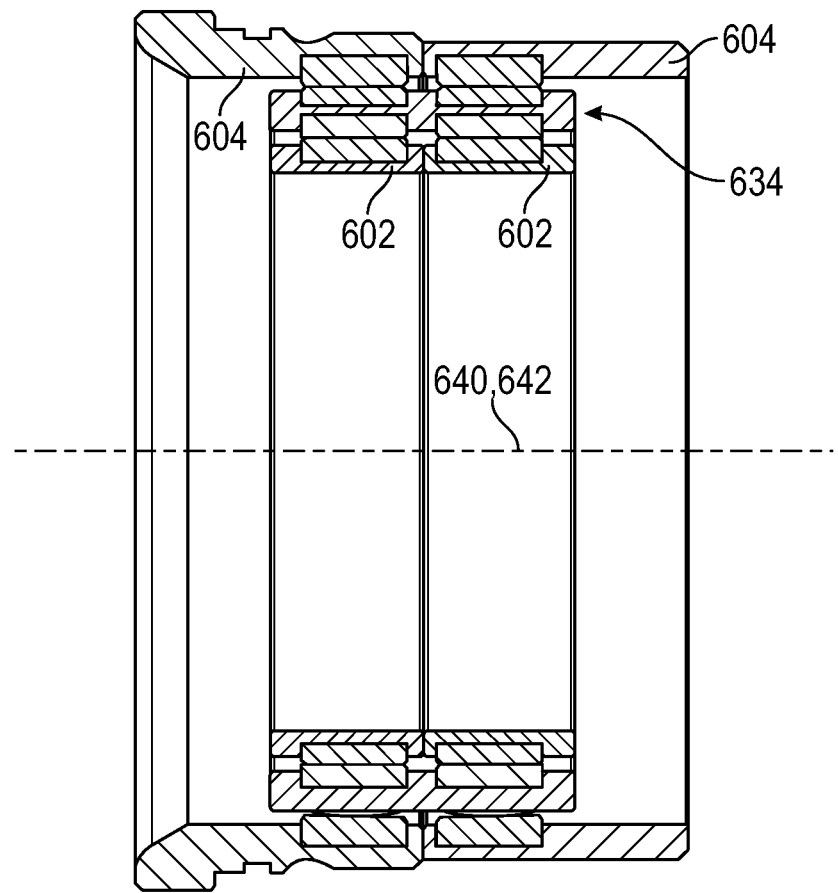
FIGS. 8A-C illustrate the operation of the FIG. 7 embodiment when encountering no load, axial loading, and a combined axial and being loading, respectively.
Figure 8C:
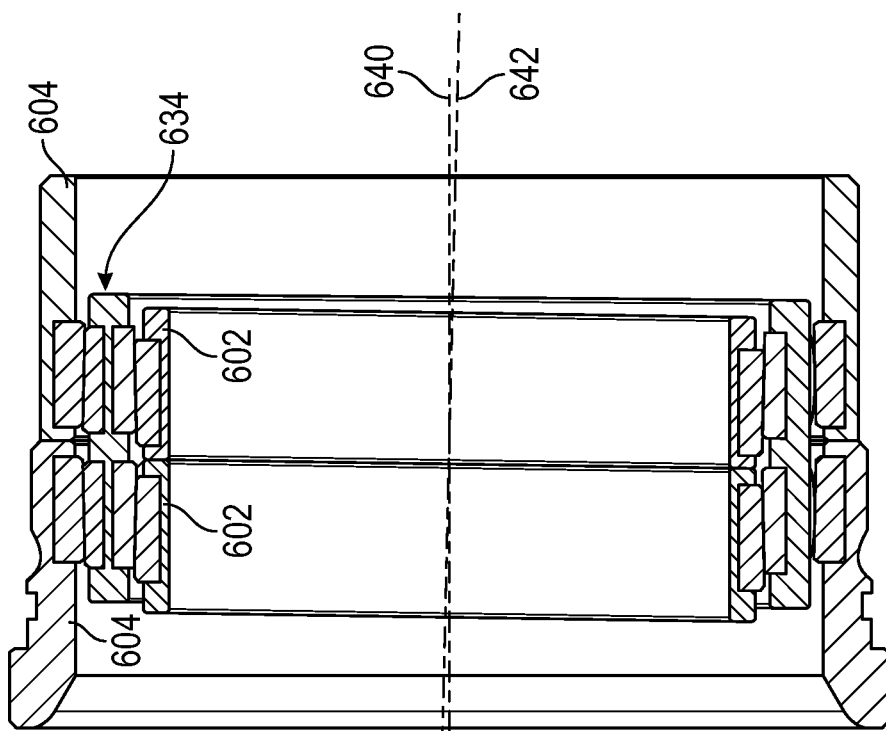
Figure 8B:
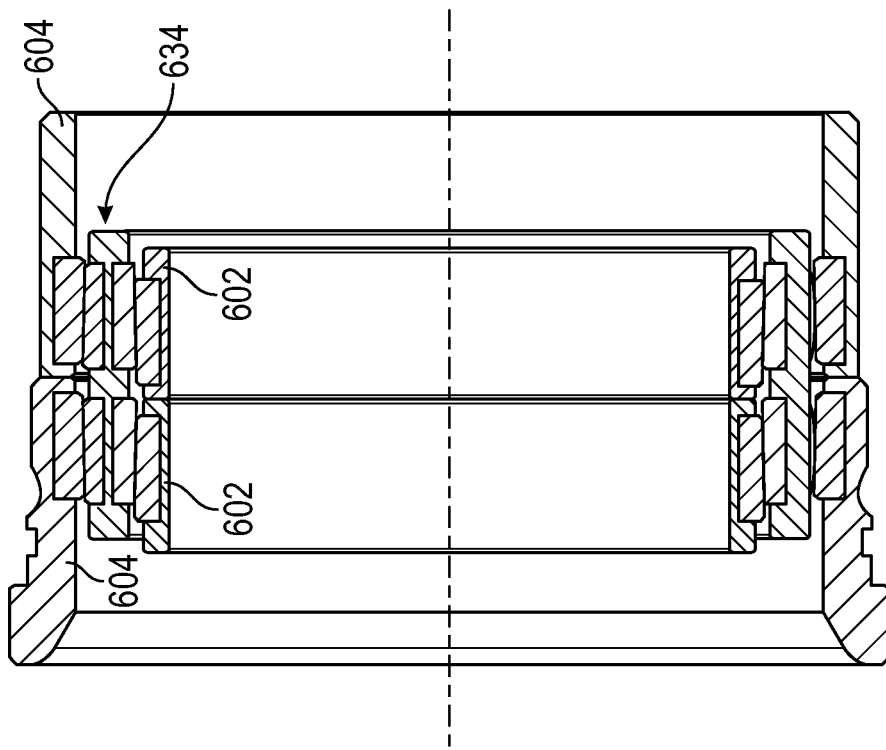

FIGS. 8A-C illustrate the operation of the alignment bearing 600. In FIG. 8A, the alignment bearing 600 is shown in a neutral alignment wherein the intermediate ring with inserts 620, 624, collectively 634, of the alignment bearing 600 are aligned. By aligned, it is meant that the inserts 634 are centered relative to the inner and outer rings 602, 604 in axial direction. Further, there is no angular misalignment between the rotational axis 640 of the outer ring 604 and the rotational axis 642 of the inner ring 602. In FIG. 8B, the alignment bearing 600 is shown in an axial misalignment. The axial misalignment is caused by the axial displacement of the inner ring 602 relative to the outer ring 604. This axial misalignment is accommodated by the paired spheroid surfaces defined by the radii 613a,c and 613b,d (FIG. 7). In FIG. 8C, the alignment bearing 600 is shown with axial displacement and angular misalignment. The axial displacement is between the inner ring 602 relative the outer ring 604. Further, an angular misalignment exists between the rotational axis 640 of the outer ring 604 and the rotational axis 642 of the inner ring 602. The axial and angular misalignment are accommodated by the paired spheroid surfaces defined by the radii 613a,c and 613b,d (FIG. 7). Despite the misalignments, the alignment bearing assembly 600 maintaining alignment between the contacting bearing surfaces; i.e., the surfaces contact one another over an area instead of at a point.

The nature of sliding bearings as disclosed herein, and in general with traditionally used sliding bearings for drilling applications, demand some minimum radial bearing play. As a consequence of the large curvature radiuses 630, 632, minimum radial play between the inner ring and intermediate ring sliding surfaces (inserts 624, 610) and between the outer ring and intermediate ring sliding surfaces (inserts 620, 614), permits comparably large axial displacement as displayed in FIG. 8B without mechanically over-constraining the bearing. The small radial play on the other hand also accounts for the possibility for the intermediate ring to pivot according to the angular misalignment and the present radial load scenario as displayed in FIG. 8C. The radial play may be in the range of up to one mm, e.g. between 0.03 mm and 0.8 mm, or even better defined in a range of 0.1 mm to 0.2 mm.

To facilitate assembly of the alignment bearing 600, one non-limiting arrangement for construction of the alignment bearing 600 uses mating halves of the inner and outer rings 602, 604 as discussed below.

Figure 9:
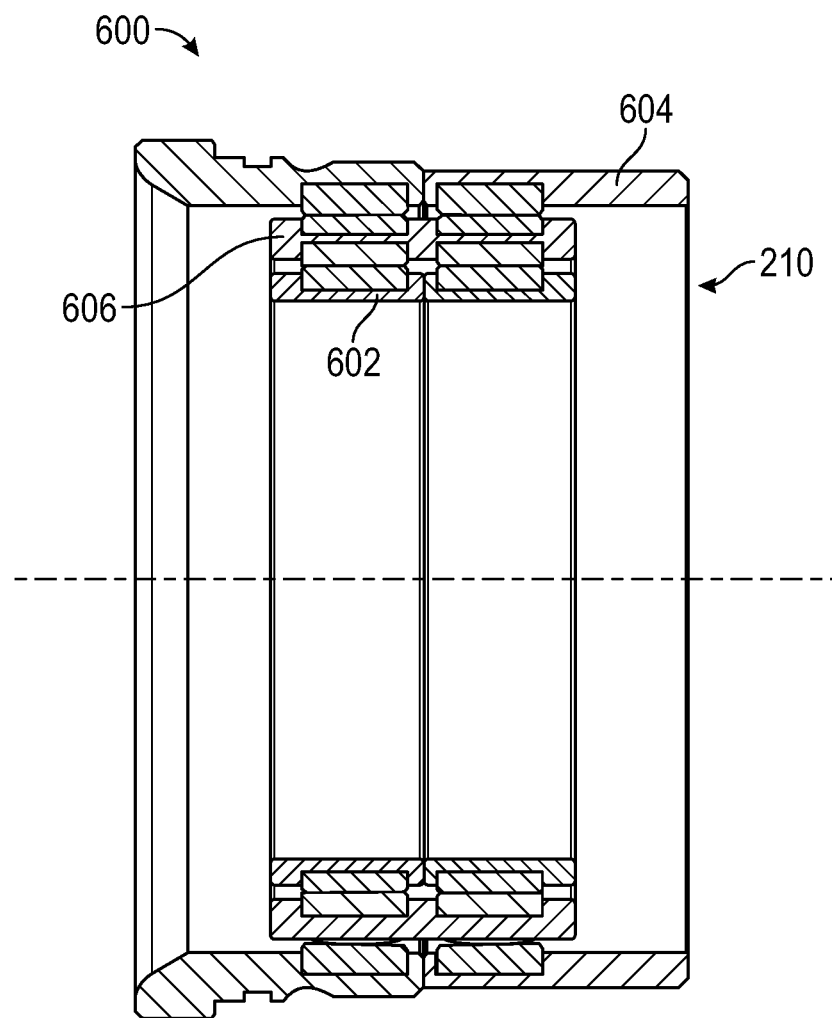
FIG. 9 illustrates another view of the FIG. 7 embodiment.
Figure 10:
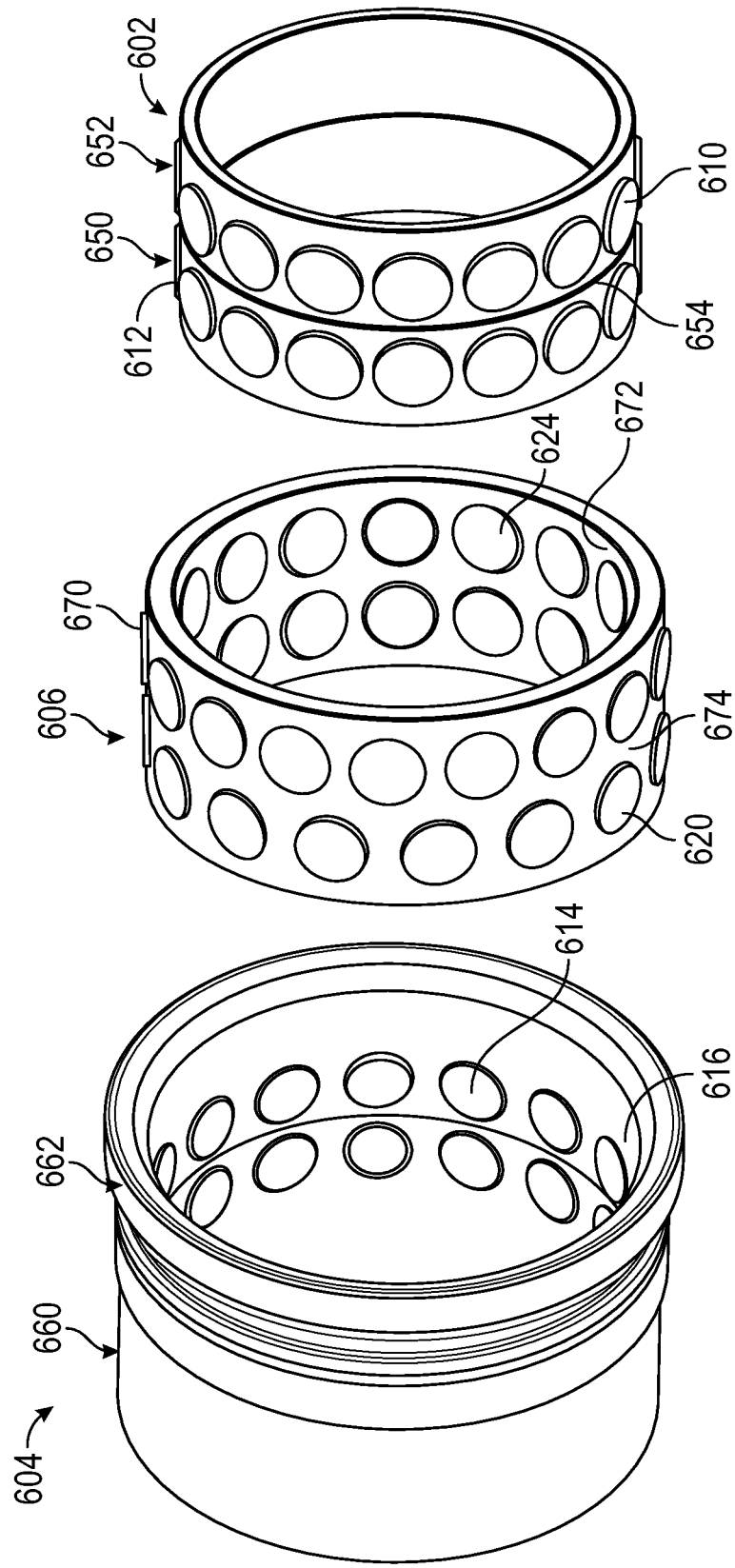
FIGS. 10A-C illustrate in "exploded format" the FIG. 7 embodiment.

Referring to FIGS. 9 and 10A-C, there is shown one non-limiting embodiment of the alignment bearing 600 in an "exploded" format. Referring to FIGS. 9 and 10C, the inner ring 602 includes a mandrel having mating halves 650, 652. Each half 650, 652 may be a rigid tubular member that together present an outer bearing surface formed by the surfaces of the inserts 610. Referring to FIGS. 9 and 10A, the outer ring 604 includes a mandrel having mating halves 660, 662. Each half 660, 662 may be a rigid tubular member that together present an inner bearing surface 616 formed by the surface of the inserts 614.

Referring to FIGS. 9 and 10B, the intermediate ring 606 includes a mandrel 670 that presents an inner surface 672 and an outer surface 674. The intermediate ring 606 includes the inserts 620 circumferentially on the outer surface 674 and the inserts 624 circumferentially distributed on the inner surface 672.

During assembly, the paired inner ring mandrels 650, 652 may be inserted from opposing ends into the intermediate ring 606. Thereafter, the paired outer ring mandrels 660, 662 may be slid around the intermediate ring 606 from opposing ends and fastened to one another, e.g. by screwing or axially clamping in a housing.

Figure 11:
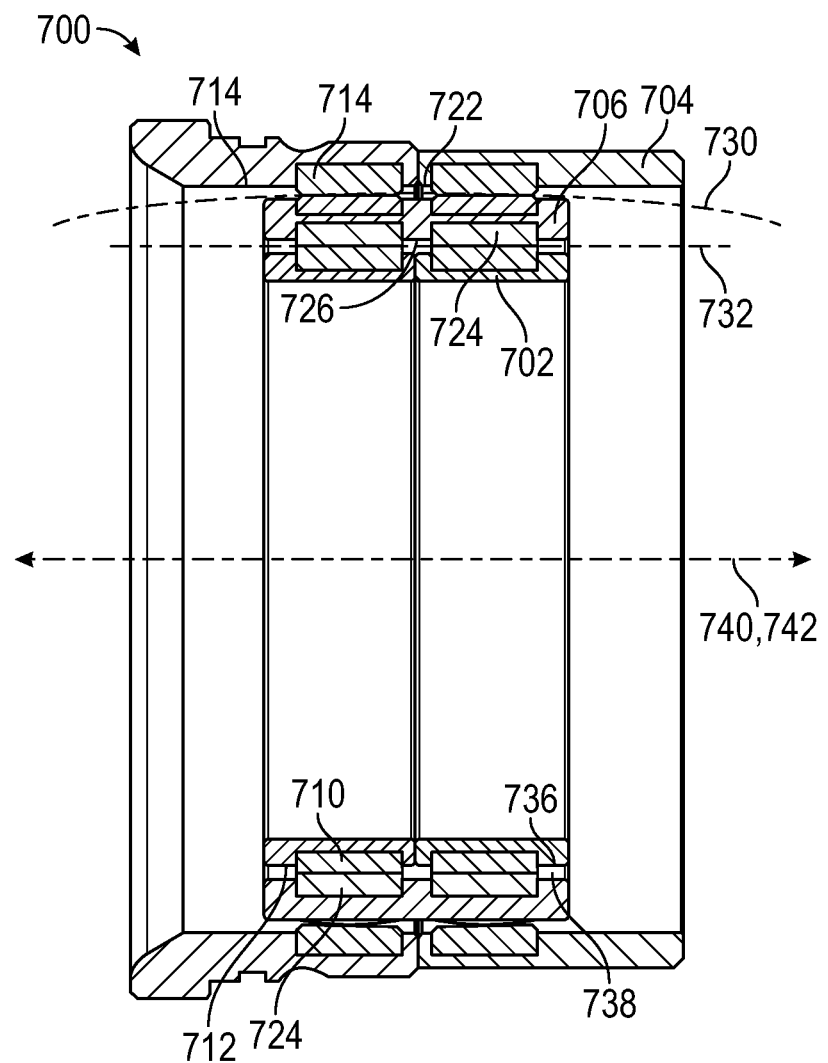
FIG. 11 illustrates another self-aligning bearing assembly in accordance with one embodiment of the present disclosure that uses spheroid and cylindrical geometries to define bearing surfaces.

Referring to FIG. 11, there is shown another self-aligning bearing 700 according to the present disclosure. In one embodiment, the self-aligning bearing 700 includes an inner ring 702, an outer ring 704, and an intermediate ring 706. The rings 702, 704, 706 are telescopically arranged and can slide relative to one another about an axis perpendicular to the rotational axis 222 of the drill string housing 220/504 or the rotational axis 115/224 of the drive shaft 218/512 when continuously rotating (e.g. rotation about one or more circumferences) about the rotational axis 222 of the drill string housing 220/504 or the rotational axis 115/224 of the drive shaft 218/512. The mating surfaces of the rings 702, 704, and 706 are bearing surfaces formed by inserts. The inner ring 702 includes inserts 710 circumferentially distributed on an outer surface 712 of inner ring 702 and the outer ring 704 has inserts 714 circumferentially distributed on an inner surface 716 of outer ring 704. The intermediate ring 706 includes inserts 720 circumferentially on an outer surface 722 and inserts 724 circumferentially distributed on an inner surface 726. The inserts 720 and 714 are arranged to slidingly engage one another and the inserts 724 and 710 are arranged to slidingly engage one another. While two rows of inserts are shown, other embodiments may include greater or fewer rows of inserts.

In one embodiment, the outer set of inserts 720, 714 share complementary curvatures to allow tilting for pitching and/or yawing movements of the intermediate ring with respect to the outer ring. Like explained above, sliding sphere 730 accounts for angular tilt according to axis misalignment and current loading situation. The radius of sphere 730 is selected to support radial loads while having sufficient curvature to allow tilting or pivoting for pitching and/or yawing movements of the inner ring 702 with respect to outer ring 704 and therefore to allow tilting or pivoting for pitching and/or yawing movements of the drive shaft 218/512 with respect to drill string housing 220/504. The inserts 720, 714 may have a curvature 730 such that a radius defining the surfaces of the inserts 720, 714 projects towards the rotational axis 115/224, 222 of the drill string housing 220/504 or the drive shaft 218/512. The spheroid surfaces of the inserts 720, 714 retains or captures the intermediate ring 706 in between the inner ring 702 and the outer ring 704, still allowing the required tilting for the pitching and yawing movement between them. The curvature of the inserts 720 may be considered convex and curvatures of the inserts 714 may be considered concave. Further, it should be noted that the curvature is in three dimensions because the curvature 730 is spherical in shape. Thus, the term "complementary curvatures" refers to curvatures that allow surfaces defined by such curvatures to physically engage and slide against one another over an area, as opposed to slide against a point. In aspects, the area is substantially a majority of the bearing surface of the inserts 720, 714. Thus, in the illustrated embodiment, the insert 720 has a surface with a curvature that is complementary to curvature defining the surface of the insert 714.

In this illustrated embodiment, the complementary configuration is obtained by pairing a convex surface with a concave surface. In another embodiment not illustrated, the curvature of the inserts 720 may be concave and curvatures of the inserts 714 may be considered convex. It should be noted that where the convex surfaces are formed on the intermediate ring 706, the intermediate ring 706 and/or the outer ring 704 comprise two single rings for assembly purposes. As a result, the two single rings would require retaining elements such as screws and clamps to hold the two single rings together during operation.

In contrast to the inserts 720, 724, the inner set of inserts 710, 724 do not have a spheroid curvature. Instead, the inserts 710, 724 have surfaces 736, 738 that conform to a cylindrical surface 732 and are shaped cylindrically. In an un-tilted condition, the cylindrical surface 732 may have a rotational axis 741 that is concentric, or at least generally parallel, with the rotational axis 740 of the outer ring 704. Thus, FIG. 11 illustrates one non-limiting embodiment wherein an inner set of inserts has a geometric shape defining a surface that is different from a geometric shape defining a surface of an outer set of inserts.

Figure 12A:
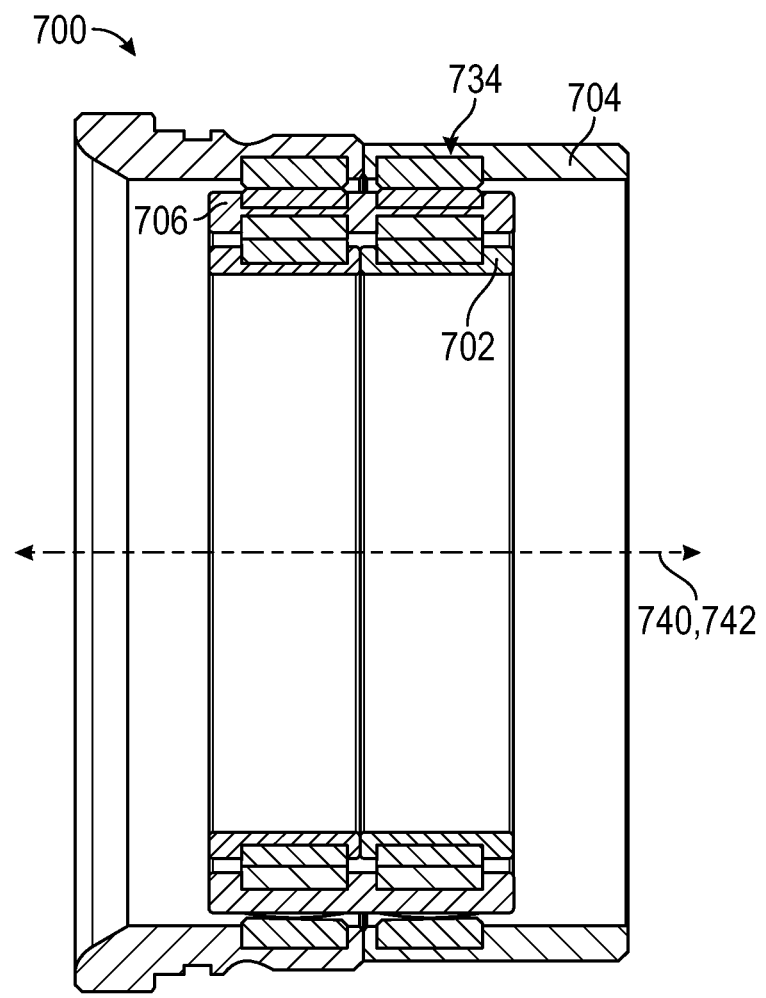
FIGS. 12A-D illustrate the operation of the 11 embodiment when encountering no displacement, axial displacement, angular displacement and a combined axial and angular displacement, respectively.
Figure 12B:
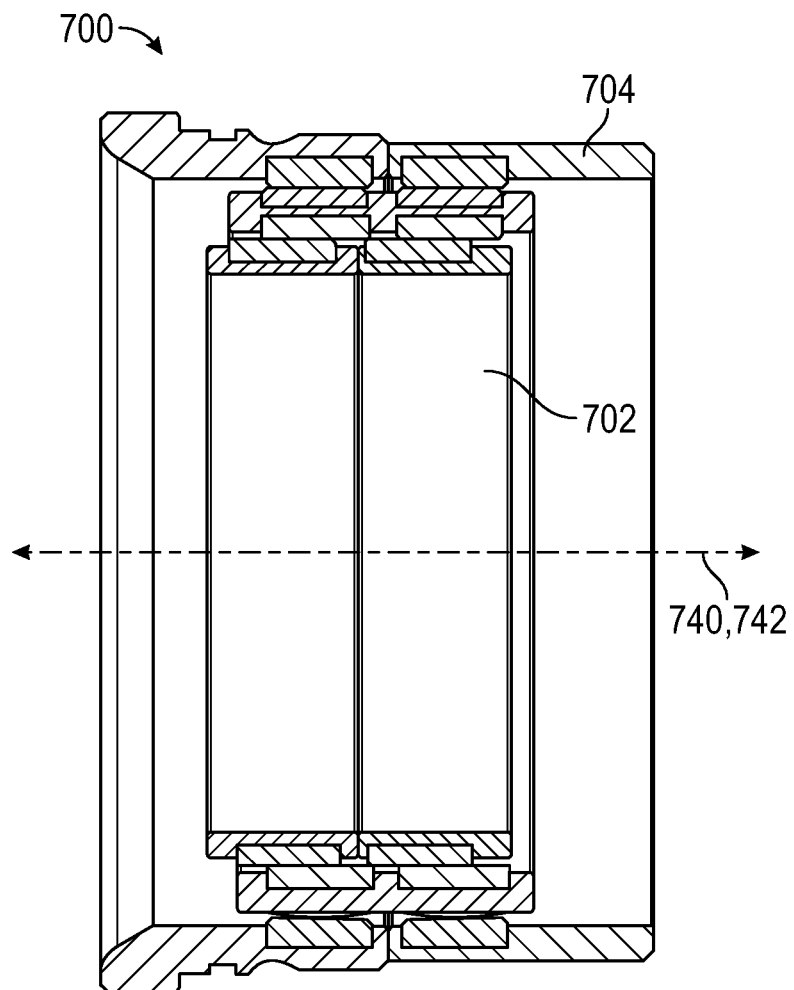
Figure 12C:
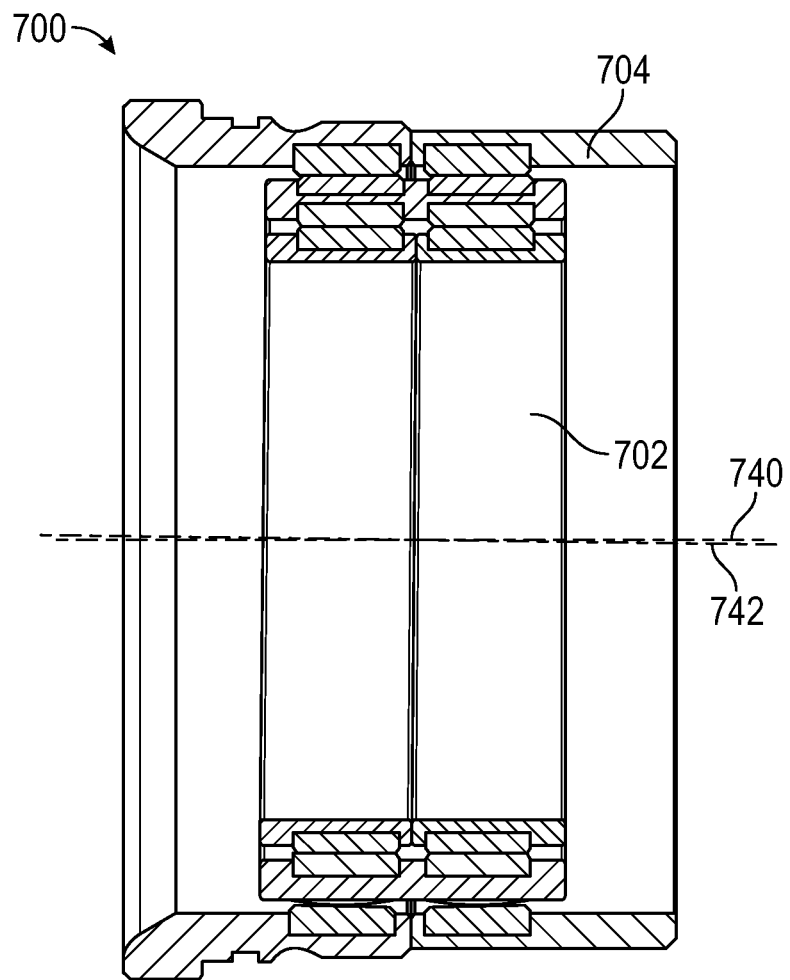
Figure 12D:
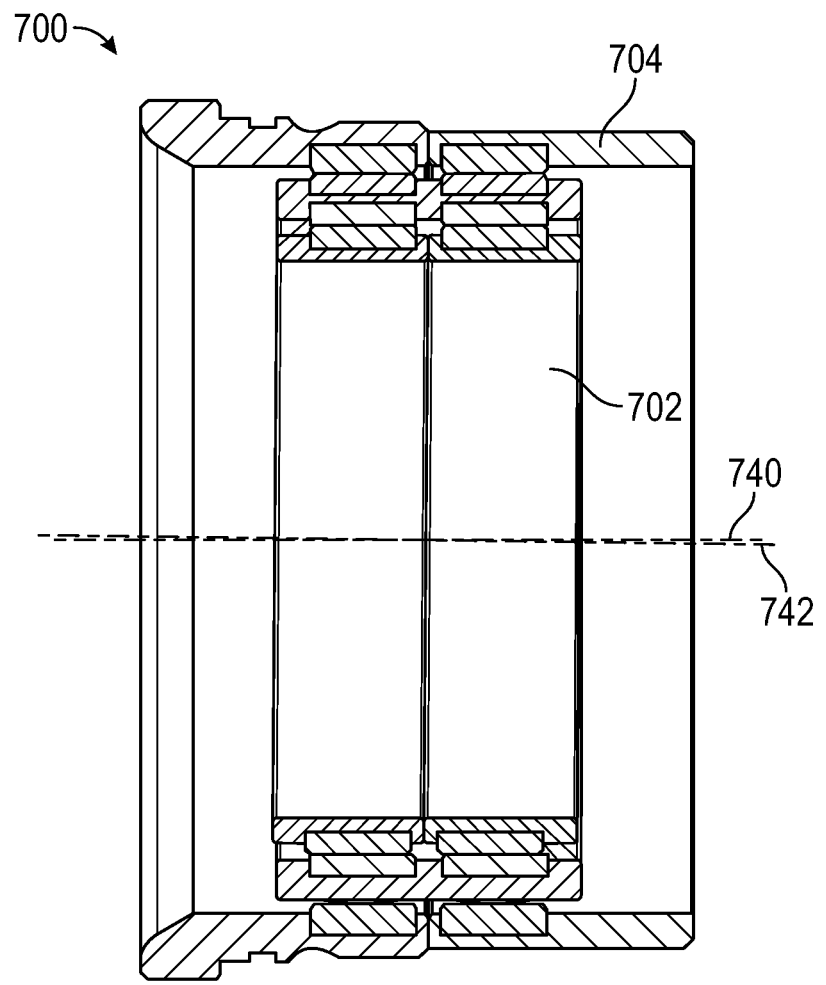

FIGS. 12A-D illustrate the operation of the bearing 700. In FIG. 12A, the bearing 700 is shown in a neutral alignment wherein the inserts, collectively 734, of the bearing 700 are aligned. By aligned, it is meant that the intermediate ring 706 is centered relative to the inner and outer rings 702, 704 in axial direction. Further, there is no angular misalignment between the rotational axis 740 of the outer ring 704 and the rotational axis 742 of the inner ring 702. In FIG. 12B, the bearing 700 is shown in an axial misalignment. The axial misalignment is caused by the axial displacement of the inner ring 702 relative to the outer ring 704 and respectively to the inner surface of the intermediate ring 706. This axial misalignment is accommodated by the cylindrical surfaces of the inserts 710, 724 that are parallel with the cylindrical surface 732 (FIG. 11). In FIG. 12C, the bearing 700 is shown with angular misalignment between the inner ring 702 relative the outer ring 704. The angular misalignment is accommodated by the spheroid surface defined by the radii 730 (FIG. 11) and the inserts 720, 714 respectively. In FIG. 12D, the bearing 700 is shown with axial displacement and angular misalignment. The axial displacement is shown between the inner ring 702 relative the outer ring 704 and the intermediate ring 706. Further, an angular misalignment exists between the rotational axis 740 of the outer ring 704 and the rotational axis 742 of the inner ring 702. The axial and angular misalignment are accommodated by the spheroid surface defined by the radii 730 (FIG. 11) and cylindrical surfaces parallel to the cylindrical surface 732 (FIG. 11). Despite the misalignments, the bearing assembly 700 maintaining alignment between the contacting bearing surfaces; i.e., the surfaces contact one another over an area instead of at a line or a point while a drive shaft 218/512 is rotating relative to the drilling housing 220/504.

Figure 13:
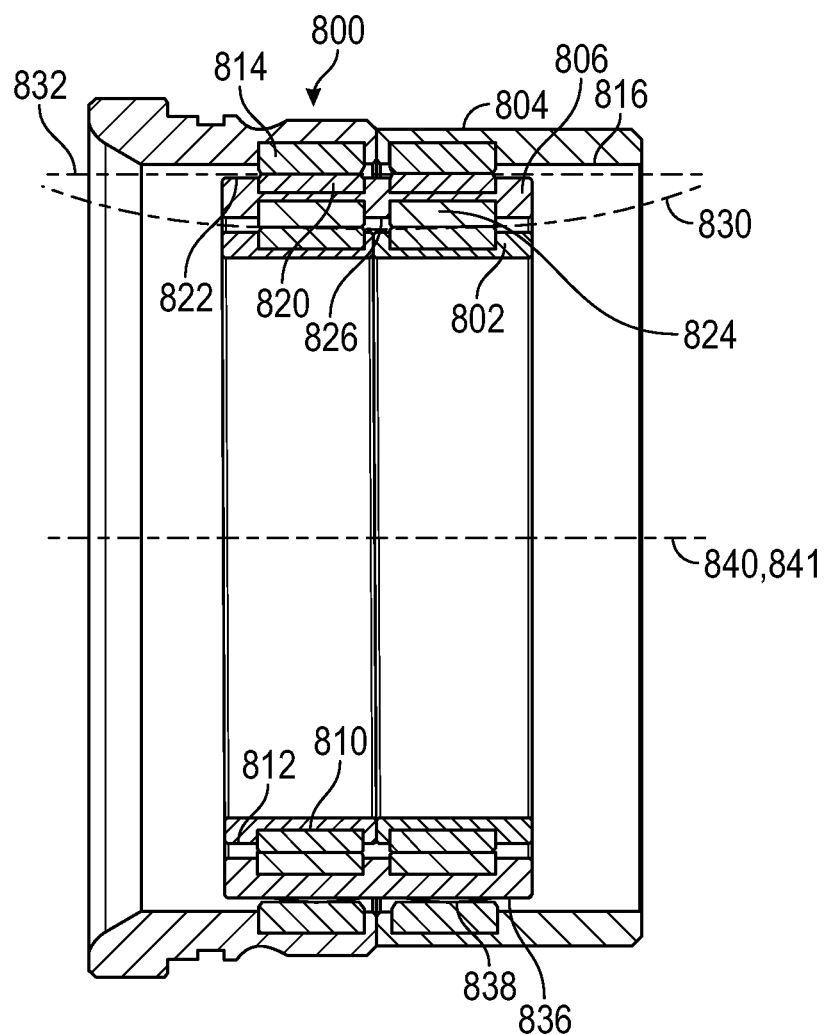
FIG. 13 illustrate yet another self-aligning bearing assembly in accordance with one embodiment of the present disclosure that uses spheroid and cylindrical geometries to define bearing surfaces.

Referring to FIG. 13, there is shown another self-aligning bearing 800 according to the present disclosure. In one embodiment, the alignment bearing 800 includes an inner ring 802, an outer ring 804, and an intermediate ring 806. The rings 802, 804, 806 are telescopically arranged and can slide relative to one another when rotated. The mating surfaces of the rings 802, 804, and 806 are bearing surfaces formed by inserts. The inner ring 802 includes inserts 810 circumferentially distributed on an outer surface 812 and the outer ring 804 has inserts 814 circumferentially distributed on an inner surface 816. The intermediate ring 806 includes inserts 820 circumferentially on an outer surface 822 and inserts 824 circumferentially distributed on an inner surface 826. The inserts 820 and 814 are arranged to slidingly engage one another and the inserts 824 and 810 are arranged to slidingly engage one another. While two rows of inserts are shown, other embodiments may include greater or fewer rows of inserts.

In one embodiment, the inner set of inserts 810, 824 share complementary curvatures. In one embodiment, the curvatures conform to a surface of a sphere, i.e., are spherically shaped. The radius of the sphere is selected to support radial loads for rotation of the drive shaft 218/512 within the drill string housing 220/504 about the rotational axis 115/224 of the drive shaft 218/512 while having sufficient curvature to allow pivoting (pitching and yawing) about an axis perpendicular to the rotational axis 222 of the drill string housing 220/504 and/or the rotational axis 115/224 of the drive shaft 218/512. The inserts 810, 824 may have a curvature 830 such that a radius defining the surfaces of the inserts 810, 824 projects away from the rotational axis 222 of the drill string housing 220/504 and/or the rotational axis 115/224 of the drive shaft 218/512. The curvature of the inserts 810 may be considered concave and curvatures of the inserts 824 may be considered convex. Further, it should be noted that the curvature is in three dimensions because the curvature 830 is spherical in shape. Thus, the term "complementary curvatures" refers to curvatures that allow surfaces defined by such curvatures to physically engage and slide against one another over an area, as opposed to a point. In aspects, the area is substantially a majority of the bearing surface of the inserts 810, 824. Thus, in the illustrated embodiment, the insert 810 has a surface with a curvature that is complementary to curvature defining the surface of the insert 824.

In this illustrated embodiment, the complementary configuration is obtained by pairing a convex surface with a concave surface. In an embodiment not illustrated, the curvature of the inserts 810 may be considered convex and curvatures of the inserts 824 may be considered concave. It should be noted that where the convex surfaces are formed on the intermediate ring 806, the inner ring 802 would be split into two single rings for assembly purposes. As a result, two single rings would require retaining elements, such as screws or clamps to hold the two single rings together during operation.

In contrast to the inserts 810, 824, the outer set of inserts 814, 820 do not have a curvature. Instead, the inserts 814, 820 have surfaces 836, 838 that conform to and are parallel with the surfaces of a cylindrical surface 832. The cylindrical surface 832 may have a rotational axis 841 that is concentric, or at least generally parallel, with the rotational axis 840 of the outer ring 804. Thus, FIG. 13 illustrates another non-limiting embodiment wherein an inner set of inserts has a geometric shape defining a surface that is different from a geometric shape defining a surface of an outer set of inserts.

FIGS. 14A-D illustrate the operation of the bearing 800. In FIG. 14A, the bearing 800 is shown in a neutral alignment wherein the inserts, collectively 834, of the bearing 800 are aligned. By aligned, it is meant that the inserts 834 are centered relative to the inner and outer rings 802, 804 in axial direction. Further, there is no angular misalignment between the rotational axis 840 of the outer ring 804 and the rotational axis 842 of the inner ring 802. In FIG. 14B, the bearing 800 is shown in an axial misalignment. The axial misalignment is cause by the axial displacement of the inner ring 802 and the intermediate ring 806 relative to the outer ring 804. This axial misalignment is accommodated by the cylindrical surfaces of the inserts 814, 820 (FIG. 13) that are parallel with the cylindrical surface 832 (FIG. 13). In FIG. 14C, the bearing 800 is shown with angular misalignment between the inner ring 802 relative the outer ring 804. The angular misalignment is between the rotational axis 840 of the outer ring 804 and the rotational axis 842 of the inner ring 802. The angular misalignment is accommodated by the spheroid surface defined by the radii 830 (FIG. 13). In FIG. 14D, the bearing 800 is shown with axial displacement and angular misalignment. The axial displacement is between the inner ring 802 relative the outer ring 804. Further, an angular misalignment exists between the rotational axis 840 of the outer ring 804 and the rotational axis 842 of the inner ring 802. The axial and angular misalignment are accommodated by the spheroid surface defined by the radii 830 (FIG. 13) and cylindrical surfaces parallel to the cylindrical surface 832 (FIG. 13). Despite the misalignments, the bearing assembly 800 maintaining alignment between the contacting bearing surfaces; i.e., the surfaces contact one another over an area instead of at a point.

While the foregoing disclosure is directed to the one mode embodiments of the disclosure, various modifications will be apparent to those skilled in the art. It is intended that all variations within the scope of the appended claims be embraced by the foregoing disclosure.

What is claimed is:

1. An apparatus for use in a drill string configured for use in a subterranean formation, the apparatus comprising:
    a drive shaft coupled to a drill bit, the drill bit configured to continuously rotate and penetrate within the subterranean formation;
    a drill string housing that houses the drive shaft, the drive shaft continuously rotating within the drill string housing relative to the drill string housing; and
    a bearing assembly configured to bear the drive shaft within the drill string housing, the bearing assembly comprising:
        a first bearing surface having a first curvature defined by a first spheroid,
        a second bearing surface having a second curvature defined by a second spheroid,
        a third bearing surface having a third curvature defined by a third spheroid, and
        a fourth bearing surface having a fourth curvature defined by a fourth spheroid and
        wherein the first spheroid, the second spheroid, the third spheroid, and the fourth spheroid have a common center point.

2. The apparatus of claim 1, wherein:
    the first bearing surface is locked with respect to rotation in a first direction to the drill string housing;
    the second bearing surface is locked with respect to rotation in a second direction to the drive shaft; and
    the first bearing surface and the second bearing surface are in sliding contact while the drive shaft continuously rotates within the drill string housing.

3. The apparatus of claim 1, wherein the drill string housing has a first rotational axis and the drive shaft has a second rotational axis and wherein the first rotational axis and the second rotational axis are inclined with respect to each other.

4. The apparatus of claim 3, further comprising one or more eccentricity members, wherein the inclination of the first rotational axis and the second rotational axis is created by the one or more eccentricity members.

5. The apparatus of claim 1, wherein the first spheroid is equal to the second spheroid and the third spheroid is equal to the fourth spheroid.

6. The apparatus of claim 1, wherein the drill string housing has a first rotational axis and the drive shaft has a second rotational axis and wherein the first bearing surface and the third bearing surface are at a different angle with respect to the first rotational axis or the second rotational axis.

7. The apparatus of claim 6, wherein the first bearing surface is inclined towards the first rotational axis or the second rotational axis in a downward direction and the third bearing surface is inclined towards the first rotational axis or the second rotational axis in an upward direction.

8. The apparatus of claim 1, further comprising an intermediate ring, in radial direction between the drill string housing and the drive shaft, wherein
    at least one of the first bearing surface and the second bearing surface is locked with respect to rotation in at least one direction to the intermediate ring; and
    the first bearing surface and the second bearing surface are in sliding contact while the drive shaft continuously rotates within the drill string housing.

9. The apparatus of claim 8, wherein
    at least one of the third bearing surface and the fourth bearing surface is locked with respect to rotation in at least one direction to the intermediate ring; and
    the third bearing surface and the fourth bearing surface are in sliding contact while the drive shaft continuously rotates within the drill string housing.

10. The apparatus of claim 9, further comprising:
    an outer ring in radial direction between the intermediate ring and the drill string housing, that is locked with respect to rotation in at least one direction to the drill string housing;
    an inner ring in radial direction between the intermediate ring and the drive shaft, that is locked with respect to rotation in at least one direction to the drive shaft, wherein
    the first bearing surface is disposed on the outer ring, the fourth bearing surface is disposed on the inner ring.

11. A method for drilling a curved borehole in a subterranean formation, comprising:
    forming a drill string, the drill string comprising:
        a drive shaft coupled to a drill bit, the drill bit configured to continuously rotate and penetrate within the subterranean formation;
        a drill string housing that houses the drive shaft, the drive shaft continuously rotating within the drill string housing relative to the drill string housing;
        a bearing assembly configured bear the drive shaft within the drill string housing, the bearing assembly comprising a bearing surface having a curvature;
    penetrating the subterranean formation with the drill string; and
    drilling the curved borehole with the drill string.

12. The method of claim 11, wherein the drill string further comprises one or more eccentricity members, the drill string housing has a first rotational axis, and the drive shaft has a second rotational axis, the method further comprising: creating, by the one or more eccentricity members an inclination of the first rotational axis and the second rotational axis.

13. An apparatus for use in a drill string configured for use in a subterranean formation, the apparatus comprising:
    a drive shaft coupled to a drill bit, the drill bit configured to continuously rotate and penetrate within the subterranean formation;
    a drill string housing that houses the drive shaft, the drive shaft continuously rotating within the drill string housing relative to the drill string housing;

a bearing assembly configured to bear the drive shaft within the drill string housing, the bearing assembly comprising a first bearing surface having a first curvature; and an intermediate ring in radial direction between the drill string housing and the drive shaft, the intermediate ring comprising an outer ring bearing surface having an outer ring bearing curvature and an inner ring bearing surface having an inner ring bearing curvature.

14. The apparatus of claim 13, wherein the first curvature is defined by a first spheroid, the second curvature is defined by a second spheroid, and wherein the first spheroid and the second spheroid have a common center point.

15. The apparatus of claim 13, wherein the first curvature is defined by a first spheroid.

16. The apparatus of claim 15, wherein the first bearing surface and the second bearing surface are configured to bear axial loadings and radial loadings, simultaneously.

17. The apparatus of claim 15, wherein the second curvature is defined by a second spheroid.

18. The apparatus of claim 13, wherein:
the first bearing surface is locked with respect to rotation in a first direction to the drill string housing;
the second bearing surface is locked with respect to rotation in a second direction to the drive shaft; and
the first bearing surface and the second bearing surface are in sliding contact while the drive shaft continuously rotates within the drill string housing.

19. The apparatus of claim 13, wherein the drill string housing has a first rotational axis and the drive shaft has a second rotational axis and wherein the first rotational axis and the second rotational axis are inclined with respect to each other.

20. The apparatus of claim 13, wherein the bearing assembly further comprises a second bearing surface having a second curvature, and wherein
at least one of the first bearing surface and the second bearing surface is locked with respect to rotation in at least one direction to the intermediate ring; and
the first bearing surface and the second bearing surface are in sliding contact while the drive shaft continuously rotates within the drill string housing.

21. The apparatus of claim 13, further comprising a third bearing surface and a fourth bearing surface, wherein
at least one of the third bearing surface and the fourth bearing surface is locked with respect to rotation in at least one direction to the intermediate ring; and
the third bearing surface and the fourth bearing surface are in sliding contact while the drive shaft continuously rotates within the drill string housing.

22. The apparatus of claim 21, further comprising:
an outer ring in radial direction between the intermediate ring and the drill string housing, that is locked with respect to rotation in at least one direction to the drill string housing;
an inner ring in radial direction between the intermediate ring and the drive shaft, that is locked with respect to rotation in at least one direction to the drive shaft, wherein
the first bearing surface is disposed on the outer ring, the fourth bearing surface is disposed on the inner ring.

* * * * *